US010725809B2

(12) United States Patent
Shan et al.

(10) Patent No.: US 10,725,809 B2
(45) Date of Patent: Jul. 28, 2020

(54) APPLICATION INTERACTION METHOD AND APPARATUS, AND TERMINAL

(71) Applicant: Huawei Technologies Co., Ltd., Shenzhen, Guangdong (CN)

(72) Inventors: Zhenwei Shan, Shenzhen (CN); Cunzhi Fan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 418 days.

(21) Appl. No.: 15/539,994

(22) PCT Filed: Dec. 27, 2014

(86) PCT No.: PCT/CN2014/095214
§ 371 (c)(1),
(2) Date: Jun. 26, 2017

(87) PCT Pub. No.: WO2016/101281
PCT Pub. Date: Jun. 30, 2016

(65) Prior Publication Data
US 2017/0351539 A1 Dec. 7, 2017

(51) Int. Cl.
*G06F 9/455* (2018.01)
*G06F 3/0481* (2013.01)
(Continued)

(52) U.S. Cl.
CPC ........ *G06F 9/45558* (2013.01); *G06F 3/0481* (2013.01); *G06F 9/54* (2013.01);
(Continued)

(58) Field of Classification Search
CPC .................................................. G06F 9/45558
See application file for complete search history.

(56) References Cited

U.S. PATENT DOCUMENTS

| 2006/0239295 A1* | 10/2006 | Rao ......................... G06F 9/465 370/466 |
| 2012/0136949 A1* | 5/2012 | Virani ................... H04L 51/046 709/206 |
| 2015/0128175 A1* | 5/2015 | Eklund ..................... G09B 5/06 725/34 |

FOREIGN PATENT DOCUMENTS

| CN | 101449582 A | 6/2009 |
| CN | 101495967 A | 7/2009 |

(Continued)

*Primary Examiner* — Suraj M Joshi
(74) *Attorney, Agent, or Firm* — Kilpatrick Townsend & Stockton LLP

(57) ABSTRACT

Embodiments of the present invention disclose an application interaction method and apparatus, and a terminal. The application interaction method includes: receiving application invitation information sent by a target application running in a first terminal, where the application invitation information carries application interaction information of the target application; detecting, according to the application interaction information, whether a currently triggered interactive application and the target application are a same application. If the interactive application and the target application are different applications, sending a notification message to an interaction application, corresponding to the application interaction information, in a preset storage area according to the application invitation information, so that the interaction application establishes a session connection to the target application according to the notification message. By means of the embodiments of the present invention, operations are easy, and application interaction processing efficiency can be improved.

18 Claims, 7 Drawing Sheets

(51) Int. Cl.
*H04L 29/12* (2006.01)
*H04L 29/08* (2006.01)
*H04L 29/06* (2006.01)
*G06F 9/54* (2006.01)

(52) U.S. Cl.
CPC ............ *H04L 29/12* (2013.01); *H04L 67/141* (2013.01); *H04L 67/16* (2013.01); *H04L 67/34* (2013.01); *H04L 67/38* (2013.01); *G06F 2009/4557* (2013.01); *G06F 2009/45595* (2013.01)

(56) References Cited

FOREIGN PATENT DOCUMENTS

| | | |
|---|---|---|
| CN | 101521874 A | 9/2009 |
| CN | 103678584 A | 3/2014 |
| CN | 103841141 A | 6/2014 |
| CN | 103916697 A | 7/2014 |

\* cited by examiner

APPLICATION INTERACTION METHOD AND APPARATUS, AND TERMINAL

CROSS REFERENCE TO RELATED APPLICATIONS

The present application claims priority under 35 U.S.C. § 365 to International Patent Application No. PCT/CN2014/095214 filed Dec. 27, 2014, which is incorporated herein by reference into the present disclosure as if fully set forth herein.

TECHNICAL FIELD

The present invention relates to the field of computer application technologies, and in particular, to an application interaction method and apparatus, and a terminal.

BACKGROUND

A second terminal may implement one-screen sharing with a first terminal by starting a one-screen application. The one-screen sharing means that different terminals (such as mobile phones, PDAs, or TVs) based on an operating system such as iOS, Android, or Symbian may perform a series of operations, such as transmission, parsing, presentation, or control of multimedia content, and the different terminals may share the multimedia content at the same time, that is, displays of the first terminal and the second terminal show same content. An application such as Fighting the Landlord, Mahjong, or Legends of the Three Kingdoms is a non-one-screen application. For example, if the first terminal invites the second terminal to play a game Fighting the Landlord, the second terminal may start a Fighting the Landlord application to perform application interaction between the Fighting the Landlord application running in the second terminal and a Fighting the Landlord application running in the first terminal. That is, displays of the terminals show different content.

In an application interaction process, the second terminal needs to start a corresponding application according to an application type of a target application running in the first terminal. When the first terminal invites the second terminal to perform application interaction, a user corresponding to the second terminal needs to determine whether the application type of the target application running in the first terminal is a one-screen application or a non-one-screen application, and starts a corresponding application in the second terminal according to a determining result. If the user incorrectly determines, an application started by the second terminal and the target application running in the first terminal may be different applications, and the application interaction fails. It is complex to operate, and application interaction processing efficiency is relatively low.

SUMMARY

Embodiments of the present invention provide an application interaction method and apparatus, and a terminal. They are easy to operate, and can improve application interaction processing efficiency.

A first aspect of the present invention provides an application interaction method, including:

receiving application invitation information sent by a target application running in a first terminal, where the application invitation information carries application interaction information of the target application;

detecting, according to the application interaction information, whether a currently triggered interactive application and the target application are a same application; and if the interactive application and the target application are different applications, sending a notification message to an interaction application, corresponding to the application interaction information, in a preset storage area according to the application invitation information, so that the interaction application establishes a session connection to the target application according to the notification message.

In a first possible implementation manner, the application interaction information includes an application type of the target application; and the detecting, according to the application interaction information, whether a currently triggered interactive application and the target application are a same application includes:

determining, according to the application interaction information, that the application type of the target application is a one-screen application; and if an application type of the interactive application is a non-one-screen application, determining that the interactive application and the target application are different applications.

With reference to possible implementation manner of the first aspect, in a second possible implementation manner, the application interaction information includes an application type of the target application and application identification information of the target application; and the detecting, according to the application interaction information, whether a currently triggered interactive application and the target application are a same application includes:

determining, according to the application interaction information, that the application type of the target application is a non-one-screen application;

if an application type of the interactive application is a non-one-screen application, and application identification information of the interactive application is different from the application identification information of the target application, determining that the interactive application and the target application are different applications.

With reference to the first aspect possible implementation manner, in a third possible implementation manner, the application interaction information includes an application type of the target application; and the detecting, according to the application interaction information, whether a currently triggered interactive application and the target application are a same application includes:

determining, according to the application interaction information, that the application type of the target application is a non-one-screen application;

if an application type of the interactive application is a non-one-screen application, sending a request message to the first terminal, where the request message is used to request to obtain application identification information of the target application;

receiving the application identification information of the target application that is sent by the first terminal; and if application identification information of the interactive application is different from the application identification information of the target application, determining that the interactive application and the target application are different applications.

With reference to the first aspect possible implementation manner, in a fourth possible implementation manner, the application interaction information includes application identification information of the target application; and the detecting, according to the application interaction information, whether a currently triggered interactive application and the target application are a same application includes:

determining an application type of the target application according to the application identification information of the target application; and detecting, according to the application type of the target application, whether the interactive application and the target application are a same application.

With reference to any one of the first aspect or the first to the fourth possible implementation manners of the first aspect, in a fifth possible implementation manner, after the detecting, according to the application interaction information, whether a currently triggered interactive application and the target application are a same application, if the interactive application and the target application are a same application, a session connection is established between the interactive application and the target application.

With reference to any one of the first aspect or the first to the fifth possible implementation manners of the first aspect, in a sixth possible implementation manner, before the sending a notification message to an interaction application, corresponding to the application interaction information, in a preset storage area according to the application invitation information, it is detected whether the interaction application is started; and if the interaction application is not started, the interaction application is started.

With reference to the sixth possible implementation manner of the first aspect, in a seventh possible implementation manner, after the detecting whether the interaction application is started, if the interaction application is not started, it is detected whether an installation package of the interaction application exists in a preset application database;

if the installation package of the interaction application does not exist in the application database, a download request message for downloading the interaction application is sent to the first terminal, so that the first terminal feeds back the installation package of the interaction application according to the download request message; and the interaction application is installed and started according to the installation package of the interaction application.

With reference to any one of the first aspect or the first to the seventh possible implementation manners of the first aspect, in an eighth possible implementation manner, the receiving application invitation information sent by a target application running in a first terminal includes:

receiving an information scanning instruction entered by a user; and receiving, according to the information scanning instruction, the application invitation information that is sent by the target application by using a preset broadcast interface.

With reference to any one of the first aspect or the first to the eighth possible implementation manners of the first aspect, in a ninth possible implementation manner, before the detecting, according to the application interaction information, whether a currently triggered interactive application and the target application are a same application, a receiving time at which the interactive application receives the application invitation information is obtained;

a receiving time at which at least one associated application receives the application invitation information is queried for; and it is determined that the receiving time at which the interactive application receives the application invitation information is earlier than receiving times at which all associated applications receive the application invitation information.

With reference to any one of the first aspect or the first to the ninth possible implementation manners of the first aspect, in a tenth possible implementation manner, before the detecting, according to the application interaction information, whether a currently triggered interactive application and the target application are a same application, application interaction prompt information is output, where the application interaction prompt information is used to prompt the user whether to perform application interaction; and application interaction acknowledgment information that is submitted by the user for the application interaction prompt information is obtained.

A second aspect of the present invention provides a computer storage medium, where the computer storage medium stores an instruction, and when the instruction is executed, the application interaction method according to any one of the first aspect or the first to the tenth possible implementation manners of the first aspect of the embodiments of the present invention is implemented.

A third aspect of the present invention provides an application interaction apparatus, including:

an invitation information receiving unit, configured to receive application invitation information sent by a target application running in a first terminal, where the application invitation information carries application interaction information of the target application;

a detection unit, configured to detect, according to the application interaction information, whether a currently triggered interactive application and the target application are a same application; and a notification message sending unit, configured to: if the detection unit detects that the interactive application and the target application are different applications, send a notification message to an interaction application, corresponding to the application interaction information, in a preset storage area according to the application invitation information, so that the interaction application establishes a session connection to the target application according to the notification message.

In a first possible implementation manner, the application interaction information includes an application type of the target application; and the detection unit includes:

an application type determining module, configured to determine, according to the application interaction information, that the application type of the target application is a one-screen application; and an application determining module, configured to: if an application type of the interactive application is a non-one-screen application, determine that the interactive application and the target application are different applications.

With reference to the third aspect possible implementation manner, in a second possible implementation manner, the application interaction information includes an application type of the target application and application identification information of the target application; and the detection unit includes:

an application type determining module, configured to determine, according to the application interaction information, that the application type of the target application is a non-one-screen application; and an application determining module, configured to: if an application type of the interactive application is a non-one-screen application, and application identification information of the interactive application is different from the application identification information of the target application, determine that the interactive application and the target application are different applications.

With reference to the third aspect possible implementation manner, in a third possible implementation manner, the application interaction information includes an application type of the target application; and the detection unit includes:

an application type determining module, configured to determine an application type of the target application according to the application identification information of the target application;

a request sending module, configured to: if an application type of the interactive application is a non-one-screen application, send a request message to the first terminal, where the request message is used to request to obtain application identification information of the target application;

an information receiving module, configured to receive the application identification information of the target application that is sent by the first terminal; and an application determining module, configured to: if application identification information of the interactive application is different from the application identification information of the target application, determine that the interactive application and the target application are different applications.

With reference to the third aspect possible implementation manner, in a fourth possible implementation manner, the application interaction information includes application identification information of the target application; and the detection unit includes:

an application type determining module, configured to determine an application type of the target application according to the application identification information of the target application; and an application determining module, configured to detect, according to the application type of the target application, whether the interactive application and the target application are a same application.

With reference to any one of the third aspect or the first to the fourth possible implementation manners of the third aspect, in a fifth possible implementation manner, the application interaction apparatus further includes:

a session connection establishment unit, configured to: if the detection unit detects that the interactive application and the target application are a same application, establish a session connection between the interactive application and the target application.

With reference to any one of the third aspect or the first to the fifth possible implementation manners of the third aspect, in a sixth possible implementation manner, the detection unit is further configured to: before the notification message sending unit sends the notification message to the interaction application, corresponding to the application interaction information, in the preset storage area according to the application invitation information, detect whether the interaction application is started; and the application interaction apparatus further includes:

an application start unit, configured to: if the detection unit detects that the interaction application is not started, start the interaction application.

With reference to the sixth possible implementation manner of the third aspect, in a seventh possible implementation manner, the detection unit is further configured to: if the interaction application is not started, detect whether an installation package of the interaction application exists in a preset application database, and if the installation package of the interaction application does not exist in the application database, send a download request message for downloading the interaction application to the first terminal, so that the first terminal feeds back the installation package of the interaction application according to the download request message; and the application start unit is further configured to install and start the interaction application according to the installation package of the interaction application.

With reference to any one of the third aspect or the first to the seventh possible implementation manners of the third aspect, in an eighth possible implementation manner, the invitation information receiving unit includes:

an instruction receiving module, configured to receive an information scanning instruction entered by a user; and an invitation information receiving module, configured to receive, according to the information scanning instruction, the application invitation information that is sent by the target application by using a preset broadcast interface.

With reference to any one of the third aspect or the first to the eighth possible implementation manners of the third aspect, in a ninth possible implementation manner, the application interaction apparatus further includes:

a time acquiring unit, configured to: before the detection unit detects, according to the application interaction information, whether the interactive application and the target application are a same application, obtain a receiving time at which the interactive application receives the application invitation information, where the time acquiring unit is further configured to query for a receiving time at which at least one associated application receives the application invitation information; and a time determining unit, configured to determine that the receiving time at which the interactive application receives the application invitation information is earlier than receiving times at which all associated applications receive the application invitation information.

With reference to any one of the third aspect or the first to the ninth possible implementation manners of the third aspect, in a tenth possible implementation manner, the application interaction apparatus further includes:

an information output unit, configured to: before the detection unit detects, according to the application interaction information, whether the interactive application and the target application are a same application, output application interaction prompt information, where the application interaction prompt information is used to prompt the user whether to perform application interaction; and an acknowledgment information acquiring unit, configured to obtain application interaction acknowledgment information that is submitted by the user for the application interaction prompt information.

A fourth aspect of the present invention provides a terminal, including a processor, a memory, and a network interface, where the memory stores a set of instructions, and the processor is configured to invoke the instructions stored in the memory, to perform the following operations:

receiving application invitation information sent by a target application running in a first terminal, where the application invitation information carries application interaction information of the target application;

detecting, according to the application interaction information, whether a currently triggered interactive application and the target application are a same application; and if the interactive application and the target application are different applications, sending a notification message to an interaction application, corresponding to the application interaction information, in a preset storage area according to the application invitation information, so that the interaction application establishes a session connection to the target application according to the notification message.

In a first possible implementation manner, the application interaction information includes an application type of the target application; and that the processor invokes the instructions stored in the memory, to perform the detecting, according to the application interaction information, whether a currently triggered interactive application and the target application are a same application includes:

determining, according to the application interaction information, that the application type of the target application is a one-screen application; and if an application type of the interactive application is a non-one-screen application, determining that the interactive application and the target application are different applications.

With reference to the fourth aspect possible implementation manner, in a second possible implementation manner, the application interaction information includes an application type of the target application and application identification information of the target application; and that the processor invokes the instructions stored in the memory, to perform the detecting, according to the application interaction information, whether a currently triggered interactive application and the target application are a same application includes:

determining, according to the application interaction information, that the application type of the target application is a non-one-screen application;

if an application type of the interactive application is a non-one-screen application, and application identification information of the interactive application is different from the application identification information of the target application, determining that the interactive application and the target application are different applications.

With reference to the fourth aspect possible implementation manner, in a third possible implementation manner, the application interaction information includes an application type of the target application; and that the processor invokes the instructions stored in the memory, to perform the detecting, according to the application interaction information, whether a currently triggered interactive application and the target application are a same application includes:

determining, according to the application interaction information, that the application type of the target application is a non-one-screen application;

if an application type of the interactive application is a non-one-screen application, sending a request message to the first terminal, where the request message is used to request to obtain application identification information of the target application;

receiving the application identification information of the target application that is sent by the first terminal; and if application identification information of the interactive application is different from the application identification information of the target application, determining that the interactive application and the target application are different applications.

With reference to the fourth aspect possible implementation manner, in a fourth possible implementation manner, the application interaction information includes application identification information of the target application; and that the processor invokes the instructions stored in the memory, to perform the detecting, according to the application interaction information, whether a currently triggered interactive application and the target application are a same application includes:

determining an application type of the target application according to the application identification information of the target application; and detecting, according to the application type of the target application, whether the interactive application and the target application are a same application.

With reference to any one of the fourth aspect or the first to the fourth possible implementation manners of the fourth aspect, in a fifth possible implementation manner, after the processor invokes the instructions stored in the memory, to perform the detecting, according to the application interaction information, whether a currently triggered interactive application and the target application are a same application, the processor further invokes the instructions to perform the following operation:

if the interactive application and the target application are a same application, establishing a session connection between the interactive application and the target application.

With reference to any one of the fourth aspect or the first to the fifth possible implementation manners of the fourth aspect, in a sixth possible implementation manner, before the processor invokes the instructions stored in the memory, to perform the sending a notification message to an interaction application, corresponding to the application interaction information, in a preset storage area according to the application invitation information, the processor further invokes the instructions to perform the following operations:

detecting whether the interaction application is started; and if the interaction application is not started, starting the interaction application.

With reference to the sixth possible implementation manner of the fourth aspect, in a seventh possible implementation manner, after the processor invokes the instructions stored in the memory, to perform the detecting whether the interaction application is started, the processor further invokes the instructions to perform the following operations:

if the interaction application is not started, detecting whether an installation package of the interaction application exists in a preset application database;

if the installation package of the interaction application does not exist in the application database, sending a download request message for downloading the interaction application to the first terminal, so that the first terminal feeds back the installation package of the interaction application according to the download request message; and installing and starting the interaction application according to the installation package of the interaction application.

With reference to any one of the fourth aspect or the first to the seventh possible implementation manners of the fourth aspect, in an eighth possible implementation manner, that the processor invokes the instructions stored in the memory, to perform the receiving application invitation information sent by a target application running in a first terminal includes:

receiving an information scanning instruction entered by a user; and receiving, according to the information scanning instruction, the application invitation information that is sent by the target application by using a preset broadcast interface.

With reference to any one of the fourth aspect or the first to the eighth possible implementation manners of the fourth aspect, in a ninth possible implementation manner, before the processor invokes the instructions stored in the memory, to perform the detecting, according to the application interaction information, whether a currently triggered interactive application and the target application are a same application, the processor further invokes the instructions to perform the following operations:

acquiring a receiving time at which the interactive application receives the application invitation information;

querying for a receiving time at which at least one associated application receives the application invitation information; and determining that the receiving time at which the interactive application receives the application invitation information is earlier than receiving times at which all associated applications receive the application invitation information.

With reference to any one of the fourth aspect or the first to the ninth possible implementation manners of the fourth aspect, in a tenth possible implementation manner, before the processor invokes the instructions stored in the memory, to perform the detecting, according to the application interaction information, whether a currently triggered interactive application and the target application are a same application, the processor further invokes the instructions to perform the following operations:

outputting application interaction prompt information, where the application interaction prompt information is used to prompt the user whether to perform application interaction; and acquiring application interaction acknowledgment information that is submitted by the user for the application interaction prompt information.

In the embodiments of the present invention, application invitation information sent by a target application running in a first terminal is received, where the application invitation information carries application interaction information of the target application, and when it is detected, according to the application interaction information, that a currently triggered interactive application and the target application are a same application, a notification message is sent to an interaction application, corresponding to the application interaction information, in a preset storage area according to the application invitation information, so that the interaction application establishes a session connection to the target application according to the notification message, which is easy to operation are easy, and can improve application interaction processing efficiency.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

Figure 1:
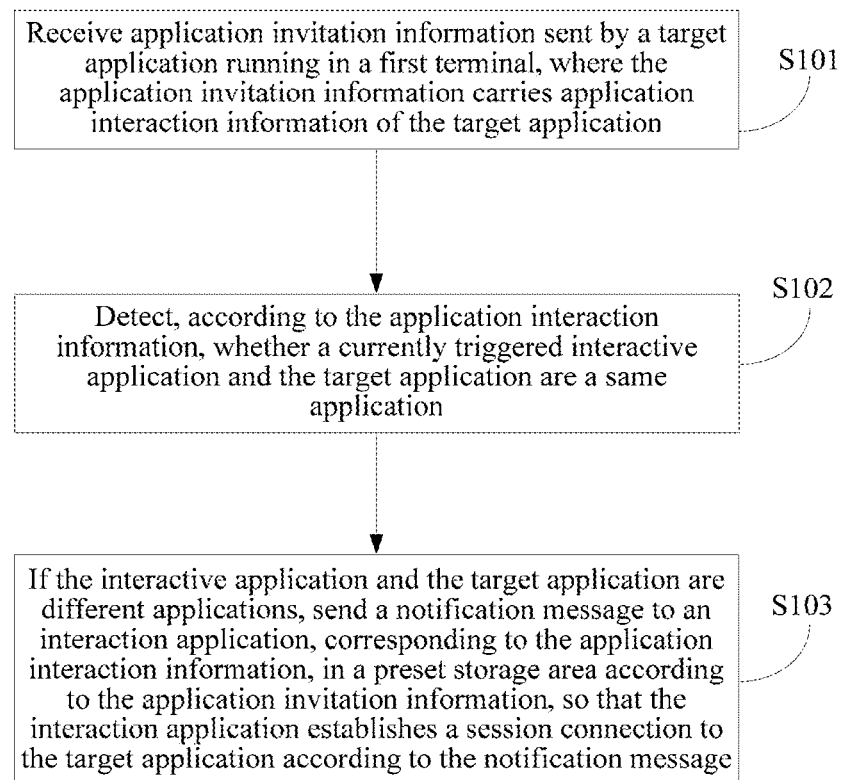
FIG. 1 is a schematic flowchart of an application interaction method according to a first embodiment of the present invention.

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention disclose an application interaction method. Application invitation information sent by a target application running in a first terminal is received, and the application invitation information may carry application interaction information of the target application. It is detected, according to the application interaction information, whether a currently triggered interactive application and the target application are a same application. If the interactive application and the target application are different applications, a notification message is sent to an interaction application, corresponding to the application interaction information, in a preset storage area according to the application invitation information, so that the interaction application establishes a session connection to the target application according to the notification message. Compared with the prior art in which a user corresponding to a second terminal needs to determine whether an application type of a target application running in a first terminal is a one-screen application or a non-one-screen application, and starts a corresponding application according to a determining result. If the user incorrectly determines, an application started by the second terminal and the target application running in the first terminal may be different applications, and application interaction fails. The present invention is easy to operate, and can improve application interaction processing efficiency.

In the embodiments of the present invention, the application may include a one-screen application or a non-one-screen application. For example, the one-screen application may include an application such as a video, music, or a slideshow. A one-screen application program such as a video, music, or a slideshow may run in a one-screen client. The non-one-screen application may include an application such as Fighting the Landlord, Mahjong, or Legends of the Three Kingdoms. A Fighting the Landlord application program may run in a Fighting the Landlord client, a Legends of the Three Kingdoms application program may run in a Legends of the Three Kingdoms client, and so on.

In the embodiments of the present invention, application interaction information may include application identification information of a target application and/or an application type of a target application. For example, the application identification information of the target application may be an application name of the target application, and the application type of the target application may include a one-screen application or a non-one-screen application.

In the embodiments of the present invention, a terminal may include a personal computer, a smartphone (for example, an Android mobile phone, or an iOS mobile phone), a tablet computer, a palmtop computer, a mobile Internet device (MID, Mobile Internet Devices), a wearable smart device, or the like. This is not specifically limited in the embodiments of the present invention.

Referring to FIG. 1, FIG. 1 is a schematic flowchart of an application interaction method according to a first embodiment of the present invention. As shown in the figure, the application interaction method in this embodiment of the present invention may include the following steps.

S101. Receive application invitation information sent by a target application running in a first terminal, where the application invitation information carries application interaction information of the target application.

A second terminal may receive the application invitation information sent by the target application running in the first terminal, and the application invitation information may carry the application interaction information of the target application. Optionally, the application interaction information may include an application type and/or application identification information of the target application. An application type of an interactive application may be a one-screen application or a non-one-screen application. The one-screen application may include an application such as a video, music, or a slideshow, and multimedia content such as a video, audio, or an image can be shared between the first terminal and the second terminal in real time. The non-one-screen application may include an application such as Fighting the Landlord, Mahjong, or Legends of the Three Kingdoms. In a process of application interaction between the first terminal and the second terminal, displays of both terminals show different content.

Optionally, when an interactive application is started, the second terminal may receive the application invitation information sent by the target application running in the first terminal. For example, if the first terminal needs to perform application interaction with the second terminal, a user corresponding to the second terminal submits, to the second terminal, a start instruction for starting an interactive application. After the second terminal starts the interactive application according to the start instruction, the second terminal may receive the application invitation information sent by the target application running in the first terminal. For another example, when the interactive application is started, the second terminal may scan to find whether the application invitation information that is broadcast by the target application by using a preset broadcast interface is received. Optionally, the second terminal may establish a communication connection to the first terminal, and when the interactive application is started, the second terminal may receive the application invitation information that is sent by the target application by using the communication connection.

Optionally, after the interactive application is started, the second terminal may receive the application invitation information sent by the target application running in the first terminal. For example, the second terminal may establish a communication connection to the first terminal, and after the interactive application is started, the second terminal may receive the application invitation information that is sent by the target application by using the communication connection. For another example, in a running process of the interactive application, the second terminal may receive an information scanning instruction entered by a user, and receive, according to the information scanning instruction, the application invitation information that is sent by the target application by using a preset broadcast interface. The information scanning instruction may be entered by the user by pressing a physical button or a soft button of the second terminal. Optionally, the information scanning instruction may be entered when a sensor detects that a preset operation such as a "swing" occurs in the second terminal. In this embodiment of the present invention, the second terminal receives, according to the information scanning instruction, the application invitation information sent by the target application, so that the second terminal can be prevented from continuously scanning the application invitation information that is broadcast by the target application, thereby saving battery power of the second terminal.

S102. Detect, according to the application interaction information, whether a currently triggered interactive application and the target application are a same application.

After receiving the application invitation information sent by the target application, the second terminal may detect, according to the application interaction information carried in the application invitation information, whether a currently triggered interactive application and the target application are a same application. If the interactive application and the target application are different applications, S103 is performed. The currently triggered interactive application may be an interactive application that is started to run in the background and is currently switched to run in the foreground, or may be an interactive application that is just started currently, or the like.

For example, when the second terminal identifies, according to the application interaction information, that the application type of the target application is a one-screen application, the second terminal may detect whether the application type of the interactive application is the same as the application type of the target application. If the application type of the interactive application is the same as the application type of the target application, the second terminal may determine that the interactive application and the target application are a same application. If the application type of the interactive application is different from the application type of the target application, the second terminal may determine that the interactive application and the target application are different applications.

For another example, when the second terminal identifies, according to the application interaction information, that the application type of the target application is a non-one-screen application, the second terminal may detect whether the application type of the interactive application is the same as the application type of the target application. If the application type of the interactive application is different from the application type of the target application, that is, the application type of the interactive application is a one-screen application, the second terminal may determine that the interactive application and the target application are different applications. If the application type of the interactive application is the same as the application type of the target application, that is, the application type of the interactive application is a non-one-screen application, the second terminal may further detect whether application identification information of the interactive application is the same as the application identification information of the target application. If the application identification information of the interactive application is the same as the application identification information of the target application, the second terminal may determine that the interactive application and the target application are a same application. If the application identification information of the interactive application is different from the application identification information of the target application, the second terminal may determine that the interactive application and the target application are different applications.

In an optional embodiment, the application interaction information may include the application type of the target application. The second terminal may determine, according to the application interaction information, whether the application type of the target application is a one-screen application or a non-one-screen application. If the second terminal determines, according to the application interaction information, that the application type of the target application is a one-screen application, and the application type of the interactive application is a non-one-screen application, the second terminal may determine that the interactive application and the target application are different applications.

In an optional embodiment, the application interaction information may include the application type of the target application and the application identification information of the target application. If the second terminal determines, according to the application interaction information, that the application type of the target application is a non-one-screen application, and the application type of the interactive application is a non-one-screen application, the second terminal may determine whether application identification information of the interactive application is the same as the application identification information of the target application. When the application identification information of the interactive application is the same as the application identification information of the target application, the second terminal may determine that the interactive application and the target application are a same application. When the application identification information of the interactive application is different from the application identification information of the target application, the second terminal may determine that the interactive application and the target application are different applications.

In an optional embodiment, the application interaction information may include the application type of the target application. If the second terminal determines, according to the application interaction information, that the application type of the target application is a non-one-screen application, and the application type of the interactive application is a non-one-screen application, the second terminal may send a request message to the first terminal, where the request message is used to request to obtain the application identification information of the target application. After receiving the application identification information of the target application that is sent by the first terminal, the second terminal may determine whether application identification information of the interactive application is the same as the application identification information of the target application. If the application identification information of the interactive application is different from the application identification information of the target application, the second terminal may determine that the interactive application and the target application are different applications.

In an optional embodiment, the application interaction information may include the application identification information of the target application. The second terminal may determine the application type of the target application according to the application identification information of the target application, and detect, according to the application type of the target application, whether the interactive application and the target application are a same application. For example, if the application identification information of the target application is "Fighting the Landlord", the second terminal may determine that the application type of the target application is a non-one-screen application. If the application type of the interactive application is a one-screen application, the second terminal may detect that the interactive application and the target application are different applications. If the application type of the interactive application is a non-one-screen application, the second terminal may determine whether application identification information of the interactive application is the same as the application identification information of the target application. If the application identification information of the interactive application is the same as the application identification information of the target application, the second terminal may detect that the interactive application and the target application are a same application. If the application identification information of the interactive application is different from the application identification information of the target application, the second terminal may detect that the interactive application and the target application are different applications.

In this embodiment of the present invention, the application may include a one-screen application or a non-one-screen application. For example, the one-screen application may include an application such as a video, music, or a slideshow. A one-screen application program such as a video, music, or a slideshow may run in a one-screen client. Using the one-screen client as a universal client for the one-screen application program such as a video, music, or a slideshow can prevent research and development personnel from developing a corresponding client for each one-screen application, thereby reducing research and development costs.

In an optional embodiment, when the interactive application and at least one associated application are running in the second terminal, the second terminal may obtain a receiving time at which the interactive application receives the application invitation information, query for a receiving time at which the at least one associated application receives the application invitation information, and when the receiving time at which the interactive application receives the application invitation information is earlier than receiving times at which all associated applications receive the application invitation information, perform the detecting, according to the application interaction information, whether the interactive application and the target application are a same application. The associated application may include a one-screen application or a non-one-screen application.

For example, after receiving the application invitation information sent by the target application, the interactive application may send query request information to an operating system. The query request information may carry an application ID (Identity, identity) of the interactive application, so that the operating system determines, according to the application ID of the interactive application, whether the associated application receives the application invitation information. If the associated application receives the application invitation information, the associated application sends, to the interactive application, a receiving time at which the associated application receives the application invitation information. If the receiving time at which the interactive application receives the application invitation information is earlier than receiving times at which all associated applications receive the application invitation information, the second terminal detects, according to the application interaction information, whether the interactive application and the target application are a same application. If the receiving time at which the at least one associated application receives the application invitation information is earlier than the receiving time at which the interactive application receives the application invitation information, the second terminal deletes the application invitation information. The application ID of the interactive application is partially the same as an application ID of the associated application.

In this embodiment of the present invention, S102 can be prevented from being repeatedly performed after the interactive application and the associated application receive the application invitation information, so that system resources can be saved, and application interaction processing efficiency can be improved.

In an optional embodiment, after receiving the application invitation information, the second terminal may output application interaction prompt information, where the application interaction prompt information is used to prompt the user whether to perform application interaction, and obtain application interaction acknowledgment information that is submitted by the user for the application interaction prompt information. The second terminal may detect, according to the application interaction information, whether the interactive application and the target application are a same application. In this embodiment of the present invention, application interaction in a case of unwillingness of a user is avoided, so that application interaction accuracy can be improved.

S103. Send a notification message to an interaction application, corresponding to the application interaction information, in a preset storage area according to the application invitation information, so that the interaction application establishes a session connection to the target application according to the notification message.

When the second terminal detects that the interactive application and the target application are different applications, the second terminal may send a notification message to an interaction application, corresponding to the application interaction information, in a preset storage area of the second terminal according to the application invitation information, so that the interaction application establishes a session connection to the target application according to the notification message. The preset storage area may be a random access memory (Random Access Memory, RAM), or may be a read only memory (Read Only Memory, ROM), or the like.

The notification message is used to trigger the interaction application to establish a session connection to the target application. The notification message may include an IP (Internet Protocol, Internet Protocol) address and/or a port number of the first terminal, or the like. For example, if the application type of the target application is a one-screen application, and the application type of the interactive application is a non-one-screen application, the second terminal may determine that the interactive application and the target application are different applications. The second terminal may send a notification message to the interaction application, corresponding to the application interaction information, in the preset storage area according to the application invitation information, that is, send a notification message to an interaction application whose application type is a one-screen application, so that the interaction application establishes a session connection to the target application according to the invitation information, thereby implementing application interaction between the interaction application and the target application.

In an optional embodiment, the second terminal may detect whether the interaction application, corresponding to the application interaction information, in the preset storage area is started, and if the interaction application is not started, start the interaction application, and send a notification message to the interaction application, so that the interaction application establishes a session connection to the target application according to the notification message.

This embodiment of the present invention can prevent that a user needs to start an interaction application again when the user incorrectly performs determining to result in that a started interactive application and a target application are different applications, is easy to operate, and improves application interaction efficiency.

Further optionally, when the second terminal detects that the interaction application is not started, the second terminal may detect whether an installation package of the interaction application exists in a preset application database. If the installation package of the interaction application does not exist in the application database, the second terminal sends a download request message for downloading the interaction application to the first terminal, so that the first terminal feeds back the installation package of the interaction application according to the download request message, and installs and starts the interaction application according to the installation package of the interaction application. If the installation package of the interaction application exists in the application database, the second terminal may detect whether the interaction application is installed, and if the interaction application is installed, start the interaction application; or if the interaction application is not installed, install and start the interaction application. The application database may be the same as the preset storage area, or may be different from the preset storage area, which is not limited in this embodiment of the present invention.

In the application interaction method shown in FIG. 1, application invitation information sent by a target application running in a first terminal is received, and when it is detected, according to application interaction information carried in the application invitation information, that a currently triggered interactive application and the target application are different applications, a notification message is sent to an interaction application, corresponding to the application interaction information, in a preset storage area according to the application invitation information, so that the interaction application establishes a session connection to the target application according to the notification message, which is easy to operate, and can improve application interaction processing efficiency.

An application interaction method provided in the first embodiment of the present invention may further include: if the interactive application and the target application are a same application, establishing a session connection between the interactive application and the target application.

When the second terminal detects that the interactive application and the target application are a same application, the second terminal may establish a session connection between the interactive application and the target application, to implement application interaction between the interactive application and the target application.

In an optional embodiment, the foregoing application interaction method may be applied to a one-screen client in the second terminal, that is, only a one-screen client exists on a display interface or a desktop of the second terminal, and no non-one-screen client exists. The non-one-screen client is, for example, a Fighting the Landlord client or a Legends of the Three Kingdoms client. When the first terminal needs to perform application interaction with the second terminal, the second terminal may start the one-screen client. A one-screen application running in the second terminal may receive application invitation information sent by a target application running in the first terminal, and the application invitation information carries application interaction information of the target application, detect, according to the application interaction information, whether the target application is a one-screen application, and if the target application is a one-screen application, determine that the one-screen application running in the second terminal and the target application are a same application, and further establish a session connection to the target application; or if the target application is a non-one-screen application, determine that the one-screen application running in the second terminal and the target application are different applications, and further send a notification message to an interaction application, corresponding to the application interaction information, in a preset storage area according to the application invitation information, so that the interaction application establishes a session connection to the target application according to the notification message.

For example, if the target application running in the first terminal is a Fighting the Landlord application, when it is detected that the one-screen application running in the second terminal and the target application are different applications, a notification message is sent to an interaction application, whose application identification information is the same as application identification information of the target application, in a preset storage area, so that a session connection is established between the interaction application and the target application. A display interface of the second terminal may show a Fighting the Landlord interface.

In this embodiment of the present invention, only a one-screen client exists on a display interface or a desktop of the second terminal, and no non-one-screen client exists. Compared with a case in which both a one-screen client and a non-one-screen client are shown on a display interface or a desktop of the second terminal, resulting in that a user needs to determine an application type of a target application, and start a corresponding application according to a determining result, in this embodiment of the present invention, a user needs to start only a universal client, which is easy to operate, and can improve operation convenience.

Figure 2:
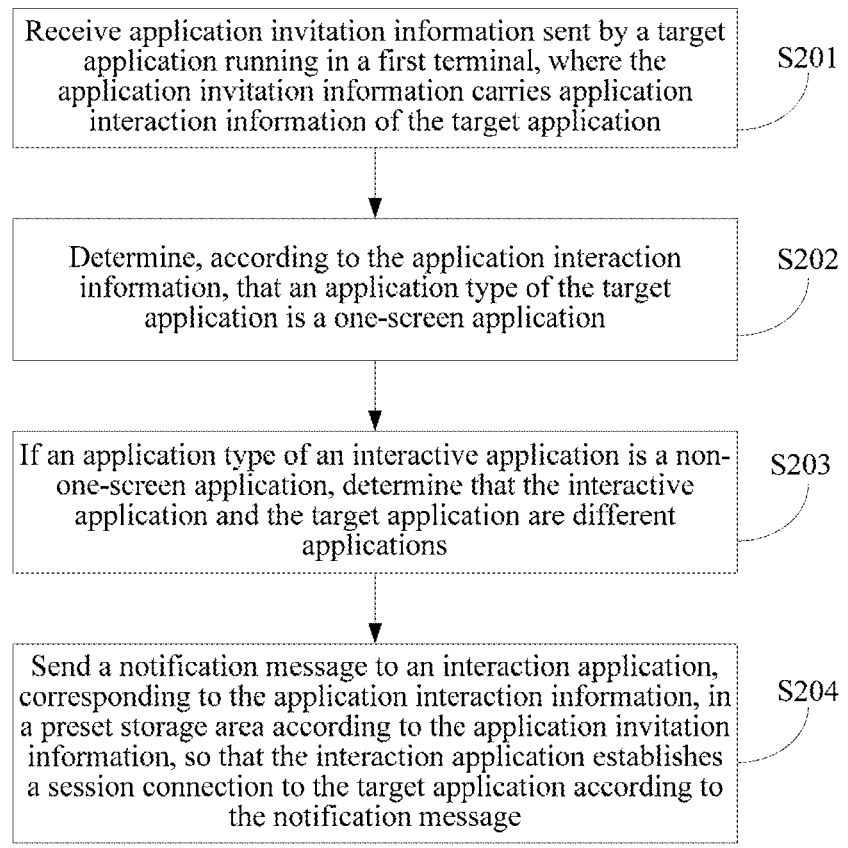
FIG. 2 is a schematic flowchart of an application interaction method according to a second embodiment of the present invention.

Referring to FIG. 2, FIG. 2 is a schematic flowchart of an application interaction method according to a second embodiment of the present invention. As shown in the figure, the application interaction method in this embodiment of the present invention may include the following steps.

S201. Receive application invitation information sent by a target application running in a first terminal, where the application invitation information carries application interaction information of the target application.

A second terminal may receive the application invitation information sent by the target application running in the first terminal, and the application invitation information may carry the application interaction information of the target application, and the application interaction information may include an application type of the target application. An application type of an interactive application may be a one-screen application or a non-one-screen application. The one-screen application may include an application such as a video, music, or a slideshow, and multimedia content such as a video, audio, or an image can be shared between the first terminal and the second terminal in real time. The non-one-screen application may include an application such as Fighting the Landlord, Mahjong, or Legends of the Three Kingdoms. In a process of application interaction between the first terminal and the second terminal, displays of both terminals show different content.

For example, the target application running in the first terminal may obtain application identification information of the target application, and obtain the application type of the target application according to the application identification information. For example, if the application identification information of the target application is a "video", the application type of the target application that is obtained by the target application is a one-screen application, and the second terminal may receive the application invitation information that is sent by the target application and that carries the application type of the target application. The target application may obtain a correspondence between the application identification information and the application type, and obtain a corresponding application type according to the application identification information of the target application. For example, an application type of an application whose application identification information is a "video", "music", a "slideshow", or "Gomoku" is a one-screen application, and an application type of an application whose application identification information is "Fighting the Landlord", "Mahjong", or "Legends of the Three Kingdoms" is a non-one-screen application.

Optionally, when an interactive application is started, the second terminal may receive the application invitation information sent by the target application running in the first terminal. For example, if the first terminal needs to perform application interaction with the second terminal, a user corresponding to the second terminal submits, to the second terminal, a start instruction for starting an interactive application. After the second terminal starts the interactive application according to the start instruction, the second terminal may receive the application invitation information sent by the target application running in the first terminal. For another example, when the interactive application is started, the second terminal may scan to find whether the application invitation information that is broadcast by the target application by using a preset broadcast interface is received. Optionally, the second terminal may establish a communication connection to the first terminal, and when the interactive application is started, the second terminal may receive the application invitation information that is sent by the target application by using the communication connection.

Optionally, after the interactive application is started, the second terminal may receive the application invitation information sent by the target application running in the first terminal. For example, the second terminal may establish a communication connection to the first terminal, and after the interactive application is started, the second terminal may receive the application invitation information that is sent by the target application by using the communication connection. For another example, in a running process of the interactive application, the second terminal may receive an information scanning instruction entered by a user, and receive, according to the information scanning instruction, the application invitation information that is sent by the target application by using a preset broadcast interface. The information scanning instruction may be entered by the user by pressing a physical button or a soft button of the second terminal. Optionally, the information scanning instruction may be entered when a sensor detects that a preset operation such as a "swing" occurs in the second terminal. In this embodiment of the present invention, the interactive application receives, according to the information scanning instruction, the application invitation information sent by the target application, so that the interactive application can be prevented from continuously scanning the application invitation information that is broadcast by the target application, thereby saving battery power of the second terminal.

In an optional embodiment, the target application may send the application invitation information by using a preset broadcast interface. When the second terminal is in a scanning state, the second terminal receives the application invitation information sent by the target application. The preset broadcast interface may include a Bluetooth broadcast interface or a Wi-Fi (Wireless Fidelity, Wireless Fidelity, a wireless local area network technology based on the IEEE 802.11 standard) broadcast interface, or the like.

In an optional embodiment, the second terminal may establish a communication connection, such as a Bluetooth connection, a Wi-Fi connection, or an NFC (Near Field Communication, Near Field Communication) connection, to the first terminal, and the second terminal receives the application invitation information that is sent by the target application by using the communication connection.

S202. Determine, according to the application interaction information, that an application type of the target application is a one-screen application.

When the application interaction information includes the application type of the target application, the second terminal may determine, according to the application interaction information, that the application type of the target application is a one-screen application. For example, if the target application is an application such as a video, music, or a slideshow, the second terminal may determine that the application type of the target application is a one-screen application.

S203. If an application type of an interactive application is a non-one-screen application, determine that the interactive application and the target application are different applications.

If the application type of the interactive application is a non-one-screen application, the second terminal may determine that the interactive application and the target application are different applications. Specifically, when the application type of the target application is a one-screen application, the second terminal may detect whether the application type of the interactive application is the same as the application type of the target application. If the application type of the interactive application is different from the application type of the target application, the second terminal may determine that the interactive application and the target application are different applications. If the application type of the interactive application is the same as the application type of the target application, the second terminal may determine that the interactive application and the target application are a same application.

Optionally, if the application type of the interactive application is a one-screen application, the second terminal may determine that the interactive application and the target application are a same application, and further the interactive application establishes a session connection to the target application, thereby implementing application interaction.

S204. Send a notification message to an interaction application, corresponding to the application interaction information, in a preset storage area according to the application invitation information, so that the interaction application establishes a session connection to the target application according to the notification message.

When the second terminal detects that the interactive application and the target application are different applications, the second terminal may send a notification message to the interaction application, corresponding to the application interaction information, in the preset storage area according to the application invitation information, so that the interaction application establishes a session connection to the target application according to the notification message.

The notification message is used to trigger the interaction application to establish a session connection to the target application. The notification message may include an IP address and/or a port number of the first terminal, or the like. Specifically, the application type of the target application is a one-screen application, and the second terminal may send a notification message to an interaction application, whose application type is a one-screen application, in the preset storage area according to the application invitation information, so that the interaction application establishes a session connection to the target application according to the notification message, thereby implementing application interaction between the interaction application and the target application.

In this embodiment of the present invention, the one-screen application may include an application such as a video, music, or a slideshow. A one-screen application program such as a video, music, or a slideshow may run in a one-screen client. Using the one-screen client as a universal client for the one-screen application program such as a video, music, or a slideshow can prevent research and development personnel from developing a corresponding client for each one-screen application, thereby reducing research and development costs.

In the application interaction method shown in FIG. 2, application invitation information sent by a target application running in a first terminal is received, and the application invitation information carries application interaction information of the target application; it is determined, according to the application interaction information, that an application type of the target application is a one-screen application; if an application type of a currently triggered interactive application is a non-one-screen application, it is determined that the interactive application and the target application are different applications; and a notification message is sent to an interaction application, corresponding to the application interaction information, in a preset storage area according to the application invitation information, so that the interaction application establishes a session connection to the target application according to the notification message, which is easy to operate, and can improve application interaction processing efficiency.

Figure 3:
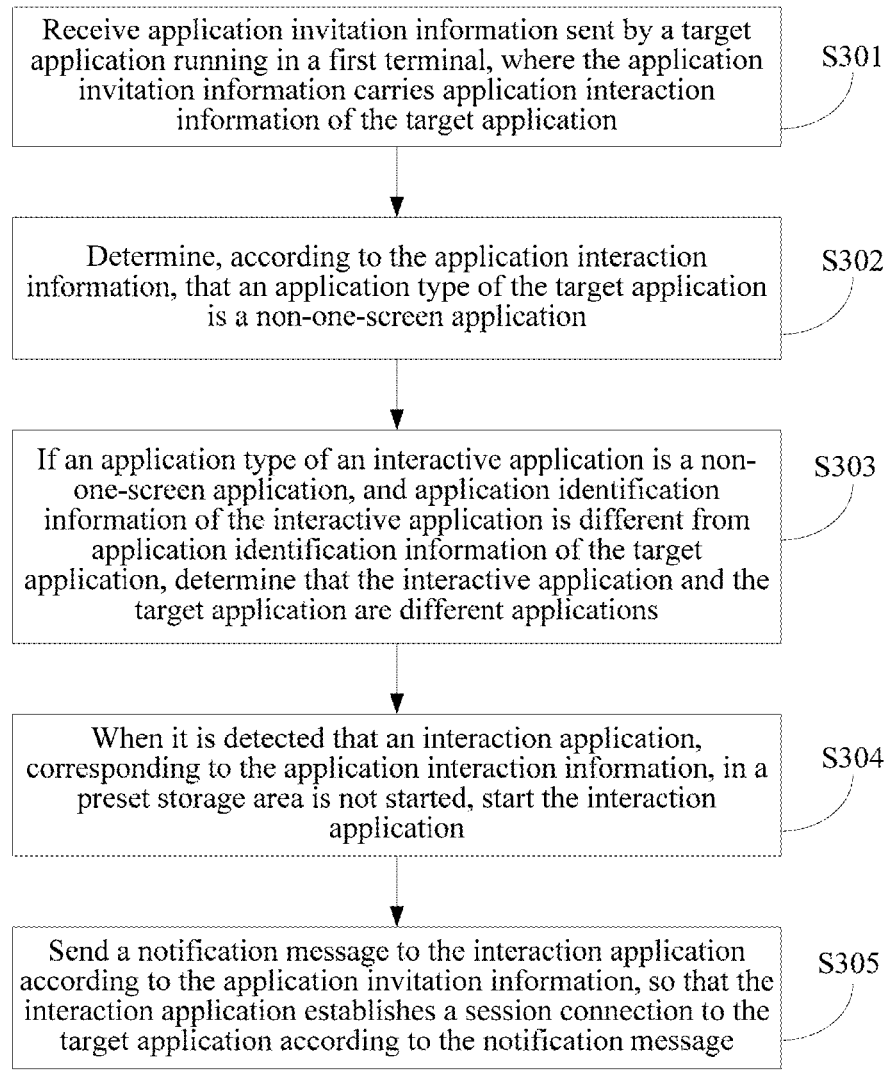
FIG. 3 is a schematic flowchart of an application interaction method according to a third embodiment of the present invention.

Referring to FIG. 3, FIG. 3 is a schematic flowchart of an application interaction method according to a third embodiment of the present invention. As shown in the figure, the application interaction method in this embodiment of the present invention may include the following steps.

S301. Receive application invitation information sent by a target application running in a first terminal, where the application invitation information carries application interaction information of the target application.

A second terminal may receive the application invitation information sent by the target application running in the first terminal, and the application invitation information may carry the application interaction information of the target application, and the application interaction information may include an application type of the target application and application identification information of the target application. An application type of an interactive application may be a one-screen application or a non-one-screen application. The one-screen application may include an application such as a video, music, or a slideshow, and multimedia content such as a video, audio, or an image can be shared between the first terminal and the second terminal in real time. The non-one-screen application may include an application such as Fighting the Landlord, Mahjong, or Legends of the Three Kingdoms. In a process of application interaction between the first terminal and the second terminal, displays of both terminals show different content.

For example, the target application running in the first terminal may obtain application identification information of the target application, and obtain the application type of the target application according to the application identification information. For example, if the application identification information of the target application is a "video", the application type of the target application that is obtained by the target application is a one-screen application, and the second terminal may receive the application invitation information that is sent by the target application and that carries the application type of the target application. The target application may obtain a correspondence between the application identification information and the application type, and obtain a corresponding application type according to the application identification information of the target application. For example, an application type of an application whose application identification information is a "video", "music", a "slideshow", or "Gomoku" is a one-screen application, and an application type of an application whose application identification information is "Fighting the Landlord", "Mahjong", or "Legends of the Three Kingdoms" is a non-one-screen application.

In an optional embodiment, the target application may send the application invitation information by using a preset broadcast interface. When the second terminal is in a scanning state, the second terminal receives the application invitation information sent by the target application. The preset broadcast interface may include a Bluetooth broadcast interface, a Wi-Fi broadcast interface, or the like.

In an optional embodiment, the second terminal may establish a communication connection, such as a Bluetooth connection, a Wi-Fi connection, or an NFC connection, to the first terminal, and the second terminal receives the application invitation information that is sent by the target application by using the communication connection.

S302. Determine, according to the application interaction information, that an application type of the target application is a non-one-screen application.

When the application interaction information includes the application type of the target application, the second terminal may determine, according to the application interaction information, that the application type of the target application is a non-one-screen application. For example, if the target application is an application such as Fighting the Landlord, Mahjong, or Legends of the Three Kingdoms, the second terminal may determine that the application type of the target application is a non-one-screen application.

In an optional embodiment, when the interactive application and at least one associated application are running in the second terminal, the second terminal may obtain a receiving time at which the interactive application receives the application invitation information, query for a receiving time at which the at least one associated application receives the application invitation information, and when it is determined that the receiving time at which the interactive application receives the application invitation information is earlier than receiving times at which all associated applications receive the application invitation information, perform the determining, according to the application interaction information, that the application type of the target application is a non-one-screen application.

For example, after receiving the application invitation information sent by the target application, the interactive application may send query request information to an operating system. The query request information may carry an application ID (Identity, identity) of the interactive application, so that the operating system determines, according to the application ID of the interactive application, whether the associated application receives the application invitation information. If the associated application receives the application invitation information, the associated application sends, to the interactive application, a receiving time at which the associated application receives the application invitation information. If it is determined that the receiving time at which the interactive application receives the application invitation information is earlier than receiving times at which all associated applications receive the application invitation information, the second terminal determines, according to the application interaction information, that the application type of the target application is a non-one-screen application. If it is determined that the receiving time at which the at least one associated application receives the application invitation information is earlier than the receiving time at which the interactive application receives the application invitation information, the second terminal deletes the application invitation information. The application ID of the interactive application is partially the same as an application ID of the associated application.

In this embodiment of the present invention, S302 to S305 can be prevented from being repeatedly performed after the interactive application and the associated application receive the application invitation information, so that system resources can be saved, and application interaction processing efficiency can be improved.

S303. If an application type of an interactive application is a non-one-screen application, and application identification information of the interactive application is different from application identification information of the target application, determine that the interactive application and the target application are different applications.

If the application type of the interactive application is a non-one-screen application, and the application identification information of the interactive application is different from the application identification information of the target application, the second terminal may determine that the interactive application and the target application are different applications. If the application identification information of the interactive application is the same as the application identification information of the target application, the second terminal may determine that the interactive application and the target application are a same application, and further a session connection is established between the interactive application and the target application. Specifically, when the application type of the interactive application is a non-one-screen application, the second terminal may determine that the application type of the interactive application is the same as the application type of the target application. The second terminal may detect whether the application identification information of the interactive application is the same as the application identification information of the target application. If the second terminal detects that the application identification information of the interactive application is the same as the application identification information of the target application, the second terminal may determine that the interactive application and the target application are a same application. If the second terminal detects that the application identification information of the interactive application is different from the application identification information of the target application, the second terminal may determine that the interactive application and the target application are different applications.

Optionally, if the application type of the interactive application is a one-screen application, the second terminal may determine that the interactive application and the target application are different applications.

S304. When it is detected that an interaction application, corresponding to the application interaction information, in a preset storage area is not started, start the interaction application.

When the second terminal determines that the interactive application and the target application are different applications, the second terminal may detect whether the interaction application, corresponding to the application interaction information, in the preset storage area is started, and if the interaction application is not started, start the interaction application; or if the interaction application is started, S305 is performed. For example, if the application identification information of the target application is "Fighting the Landlord", when the second terminal determines that the interactive application and the target application are different applications, the second terminal may detect whether an interaction application, whose application identification information is the same as the application identification information of the target application, in the preset storage area is started, and if the interaction application is not started, start the interaction application.

In an optional embodiment, when the second terminal detects that the interaction application is not started, the second terminal may detect whether an installation package of the interaction application exists in a preset application database. If the installation package of the interaction application does not exist in the application database, the second terminal sends a download request message for downloading the interaction application to the first terminal, so that the first terminal feeds back the installation package of the interaction application according to the download request message, and further installs and starts the interaction application according to the installation package of the interaction application. If the installation package of the interaction application exists in the application database, the second terminal may detect whether the interaction application is installed, and if the interaction application is installed, start the interaction application; or if the interaction application is not installed, install and start the interaction application.

S305. Send a notification message to the interaction application according to the application invitation information, so that the interaction application establishes a session connection to the target application according to the notification message.

After the interaction application is started, the second terminal may send a notification message to the interaction application according to the application invitation information, so that the interaction application establishes a session connection to the target application according to the notification message. The notification message is used to trigger the interaction application to establish a session connection to the target application. The notification message may include an IP address and/or a port number of the first terminal, or the like. Specifically, the application type of the target application is a non-one-screen application, and the second terminal may send a notification message to the interaction application according to the application invitation information, so that the interaction application establishes a session connection to the target application according to the notification message, thereby implementing application interaction between the interaction application and the target application. Application identification information of the interaction application is the same as the application identification information of the target application.

In the application interaction method shown in FIG. 3, application invitation information sent by a target application running in a first terminal is received, and the application invitation information carries application interaction information of the target application; it is determined that an application type of the target application is a non-one-screen application; if an application type of an interactive application is a non-one-screen application, and application identification information of the interactive application is different from application identification information of the target application, it is determined that the interactive application and the target application are different applications; when it is detected that an interaction application, corresponding to the application interaction information, in a preset storage area is not started, the interaction application is started, and a notification message is sent to the interaction application according to the application invitation information, so that the interaction application establishes a session connection to the target application according to the notification message, which is easy to operate, and can improve application interaction processing efficiency.

Figure 4:
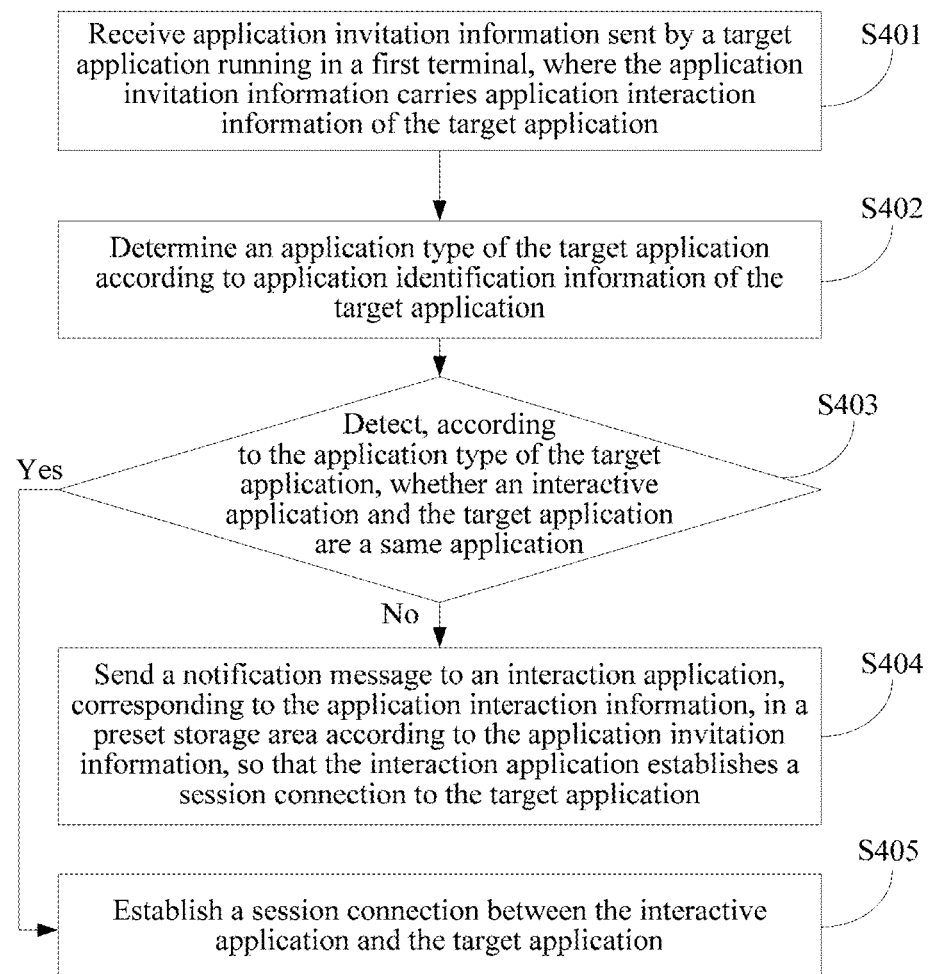
FIG. 4 is a schematic flowchart of an application interaction method according to a fourth embodiment of the present invention.

Referring to FIG. 4, FIG. 4 is a schematic flowchart of an application interaction method according to a fourth embodiment of the present invention. As shown in the figure, the application interaction method in this embodiment of the present invention may include the following steps.

S401. Receive application invitation information sent by a target application running in a first terminal, where the application invitation information carries application interaction information of the target application.

A second terminal may receive the application invitation information sent by the target application running in the first terminal, and the application invitation information may carry the application interaction information of the target application, and the application interaction information may include application identification information of the target application. An application type of an interactive application may be a one-screen application or a non-one-screen application.

In an optional embodiment, the target application may send the application invitation information by using a preset broadcast interface. When the second terminal is in a scanning state, the second terminal receives the application invitation information sent by the target application. The preset broadcast interface may include a Bluetooth broadcast interface, a Wi-Fi broadcast interface, or the like.

In an optional embodiment, the second terminal may establish a communication connection, such as a Bluetooth connection, a Wi-Fi connection, or an NFC connection, to the first terminal, and the second terminal receives the application invitation information that is sent by the target application by using the communication connection.

S402. Determine an application type of the target application according to application identification information of the target application.

The second terminal may determine the application type of the target application according to the application identification information of the target application. For example, if the application identification information of the target application is a "video", the second terminal may determine that the application type of the target application is a one-screen application. The second terminal may obtain a correspondence between the application identification information and the application type, and obtain a corresponding application type according to the application identification information of the target application. For example, an application type of an application whose application identification information is a "video", "music", a "slideshow", or "Gomoku" is a one-screen application, and an application type of an application whose application identification information is "Fighting the Landlord", "Mahjong", or "Legends of the Three Kingdoms" is a non-one-screen application.

S403. Detect, according to the application type of the target application, whether an interactive application and the target application are a same application.

The second terminal may detect, according to the application type of the target application, whether the interactive application and the target application are a same application. If the interactive application and the target application are a same application, S405 is performed. If the interactive application and the target application are different applications, S404 is performed.

For example, if the second terminal identifies, according to the application interaction information, that the application type of the target application is a one-screen application, the second terminal may detect whether the application type of the interactive application is the same as the application type of the target application. If the application type of the interactive application is the same as the application type of the target application, the second terminal may determine that the interactive application and the target application are a same application. If the application type of the interactive application is different from the application type of the target application, the second terminal may determine that the interactive application and the target application are different applications.

For another example, when the second terminal identifies, according to the application interaction information, that the application type of the target application is a non-one-screen application, the second terminal may detect whether the application type of the interactive application is the same as the application type of the target application. If the application type of the interactive application is different from the application type of the target application, that is, the application type of the interactive application is a one-screen application, the second terminal may determine that the interactive application and the target application are different applications. If the application type of the interactive application is the same as the application type of the target application, that is, the application type of the interactive application is a non-one-screen application, the second terminal may further detect whether application identification information of the interactive application is the same as the application identification information of the target application. If the application identification information of the interactive application is the same as the application identification information of the target application, the second terminal may determine that the interactive application and the target application are a same application. If the application identification information of the interactive application is different from the application identification information of the target application, the second terminal may determine that the interactive application and the target application are different applications.

S404. Send a notification message to an interaction application, corresponding to the application interaction information, in a preset storage area according to the application invitation information, so that the interaction application establishes a session connection to the target application according to the notification message.

When the second terminal detects that the interactive application and the target application are different applications, the second terminal may send a notification message to the interaction application, corresponding to the application interaction information, in the preset storage area according to the application invitation information, so that the interaction application establishes a session connection to the target application according to the notification message.

The notification message is used to trigger the interaction application to establish a session connection to the target application. The notification message may include an IP address and/or a port number of the first terminal, or the like. For example, the application identification information of the target application is a "video", and the second terminal may send a notification message to an interaction application, whose application type is a one-screen application, in the preset storage area according to the application invitation information, so that the interaction application establishes a session connection to the target application according to the notification message, thereby implementing application interaction between the interaction application and the target application. For another example, the application identification information of the target application is "Fighting the Landlord", and the second terminal may send a notification message to an interaction application, whose application identification information is the same as the application identification information of the target application, in the preset storage area according to the application invitation information, so that the interaction application establishes a session connection to the target application according to the notification message, thereby implementing application interaction between the interaction application and the target application.

S405. Establish a session connection to the target application.

When the second terminal detects that the interactive application and the target application are a same application, the second terminal may establish a session connection between the interactive application and the target application, to implement application interaction between the interactive application and the target application.

In the application interaction method shown in FIG. 4, application invitation information sent by a target application running in a first terminal is received, and the application invitation information carries application interaction information of the target application; an application type of the target application is determined according to application identification information of the target application. It is detected, according to the application type of the target application, whether an interactive application and the target application are a same application. If the interactive application and the target application are different applications, a notification message is sent to an interaction application, corresponding to the application interaction information, in a preset storage area according to the application invitation information, so that the interaction application establishes a session connection to the target application according to the notification message, which is easy to operate, and can improve application interaction processing efficiency.

Figure 5:
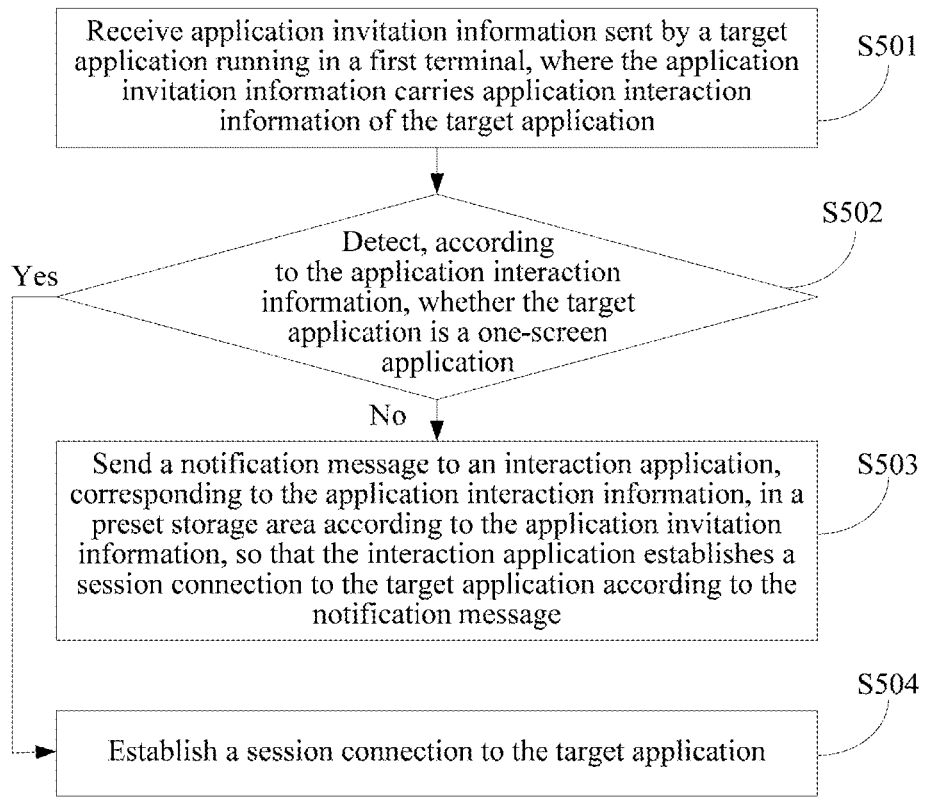
FIG. 5 is a schematic flowchart of an application interaction method according to a fifth embodiment of the present invention.

Referring to FIG. 5, FIG. 5 is a schematic flowchart of an application interaction method according to a fifth embodiment of the present invention. The application interaction method in this embodiment of the present invention may be applied to a one-screen client. As shown in the figure, the application interaction method in this embodiment of the present invention may include the following steps.

S501. Receive application invitation information sent by a target application running in a first terminal, where the application invitation information carries application interaction information of the target application.

A one-screen application running in a second terminal may receive the application invitation information sent by the target application running in the first terminal, and the application invitation information carries the application interaction information of the target application. Optionally, the application interaction information may include an application type and/or application identification information of the target application.

Optionally, when the one-screen application is started, the one-screen application may receive the application invitation information sent by the target application running in the first terminal. For example, if the first terminal needs to perform application interaction with the second terminal, a user corresponding to the second terminal submits, to the second terminal, a start instruction for starting the one-screen application. After the second terminal starts the one-screen application according to the start instruction, the one-screen application may receive the application invitation information sent by the target application running in the first terminal. For another example, when the one-screen application is started, the one-screen application may scan to find whether the application invitation information that is broadcast by the target application by using a preset broadcast interface is received. Optionally, the second terminal may establish a communication connection to the first terminal, and when the one-screen application is started, the one-screen application may receive the application invitation information that is sent by the target application by using the communication connection.

Optionally, after the one-screen application is started, the one-screen application may receive the application invitation information sent by the target application running in the first terminal. For example, the second terminal may establish a communication connection to the first terminal, and after the one-screen application is started, the one-screen application may receive the application invitation information that is sent by the target application by using the communication connection. For another example, in a running process of the one-screen application, the one-screen application may receive an information scanning instruction entered by a user, and receive, according to the information scanning instruction, the application invitation information that is sent by the target application by using a preset broadcast interface. The information scanning instruction may be entered by the user by pressing a physical button or a soft button of the second terminal. Optionally, the information scanning instruction may be entered when a sensor detects that a preset operation such as a "swing" occurs in the second terminal. In this embodiment of the present invention, the one-screen application receives, according to the information scanning instruction, the application invitation information sent by the target application, so that the one-screen application can be prevented from continuously scanning the application invitation information that is broadcast by the target application, thereby saving battery power of the second terminal.

S502. Detect, according to the application interaction information, whether the target application is a one-screen application.

The one-screen application may detect, according to the application interaction information, whether the target application is a one-screen application. If the target application is a one-screen application, the one-screen application determines that the one-screen application and the target application are a same application, and S504 is further performed. If the target application is a non-one-screen application, the one-screen application determines that the one-screen application and the target application are different applications, and S503 is further performed.

In an optional embodiment, the application interaction information may include an application type of the target application. The one-screen application may determine, according to the application interaction information, whether the application type of the target application is a one-screen application or a non-one-screen application. If the one-screen application determines that the application type of the target application is a one-screen application, the one-screen application may determine that the one-screen application and the target application are a same application. If the one-screen application determines, according to the application interaction information, that the application type of the target application is a non-one-screen application, the one-screen application may determine that the one-screen application and the target application are different applications.

In an optional embodiment, the application interaction information may include the application identification information of the target application. The one-screen application may determine the application type of the target application according to the application identification information of the target application, and detect, according to the application type of the target application, whether the one-screen application and the target application are a same application. For example, if the application identification information of the target application is "Fighting the Landlord", and the one-screen application may determine that the application type of the target application is a non-one-screen application, the one-screen application may detect that the one-screen application and the target application are different applications. For another example, if the application identification information of the target application is a "video", and the one-screen application may determine that the application type of the target application is a one-screen application, the one-screen application may detect that the one-screen application and the target application are a same application.

In an optional embodiment, after receiving the application invitation information, the one-screen application may output application interaction prompt information, where the application interaction prompt information is used to prompt the user whether to perform application interaction, and obtain application interaction acknowledgment information that is submitted by the user for the application interaction prompt information. The one-screen application may detect, according to the application interaction information, whether the target application is a one-screen application. In this embodiment of the present invention, application interaction in a case of unwillingness of a user is avoided, so that application interaction accuracy can be improved.

S503. Send a notification message to an interaction application, corresponding to the application interaction information, in a preset storage area according to the application invitation information, so that the interaction application establishes a session connection to the target application according to the notification message.

When the one-screen application detects that the target application is not a one-screen application, the one-screen application may send a notification message to the interaction application, corresponding to the application interaction information, in the preset storage area according to the application invitation information, so that the interaction application establishes a session connection to the target application according to the notification message.

The notification message is used to trigger the interaction application to establish a session connection to the target application. The notification message may include an IP address and/or a port number of the first terminal, or the like. For example, if the application identification information of the target application is "Fighting the Landlord", and it is determined that the target application is a non-one-screen application, the one-screen application may send, according to the application invitation information, a notification message to an interaction application whose application identification information is the same as the application identification information of the target application, so that the interaction application establishes a session connection to the target application according to the notification message, thereby implementing application interaction between the interaction application and the target application.

In an optional embodiment, the one-screen application may detect whether the interaction application corresponding to the application interaction information is started, and if the interaction application is not started, trigger starting of the interaction application, and send a notification message to the interaction application according to the application invitation information, so that the interaction application establishes a session connection to the target application according to the notification message. For example, when the one-screen application detects that the interaction application is not started, the one-screen application may send, to an operating system, a start instruction for starting the interaction application, so that the operating system starts the interaction application, and further, the one-screen application sends a notification message to the interaction application according to the application invitation information, so that the interaction application establishes a session connection to the target application according to the notification message.

Further optionally, when the one-screen application detects that the interaction application is not started, the one-screen application may detect whether an installation package of the interaction application exists in a preset application database. If the installation package of the interaction application does not exist in the application database, the one-screen application sends a download request message for downloading the interaction application to the first terminal, so that the first terminal feeds back the installation package of the interaction application according to the download request message, and triggers installation and starting of the interaction application according to the installation package of the interaction application. If the installation package of the interaction application exists in the application database, an application interaction client may detect whether the interaction application is installed, and if the interaction application is installed, trigger starting of the interaction application; or if the interaction application is not installed, trigger installation and starting of the interaction application.

S504. Establish a session connection to the target application.

When the one-screen application detects that the target application is a one-screen application, the one-screen application may establish a session connection to the target application, thereby implementing application interaction between the one-screen application and the target application.

In the application interaction method shown in FIG. 5, application invitation information sent by a target application running in a first terminal is received, and the application invitation information carries application interaction information of the target application; when it is detected, according to the application interaction information, that a one-screen application and the target application are different applications, a notification message is sent to an interaction application, corresponding to the application interaction information, in a preset storage area according to the application invitation information, so that the interaction application establishes a session connection to the target application according to the notification message, which is easy to operate, and can improve application interaction processing efficiency.

An embodiment of the present invention further provides a computer storage medium. The computer storage medium may store an instruction, and when the instruction is executed, the application interaction method shown in any accompanying drawing of FIG. 1 to FIG. 5 can be implemented, where the instruction may be program code.

Figure 6:
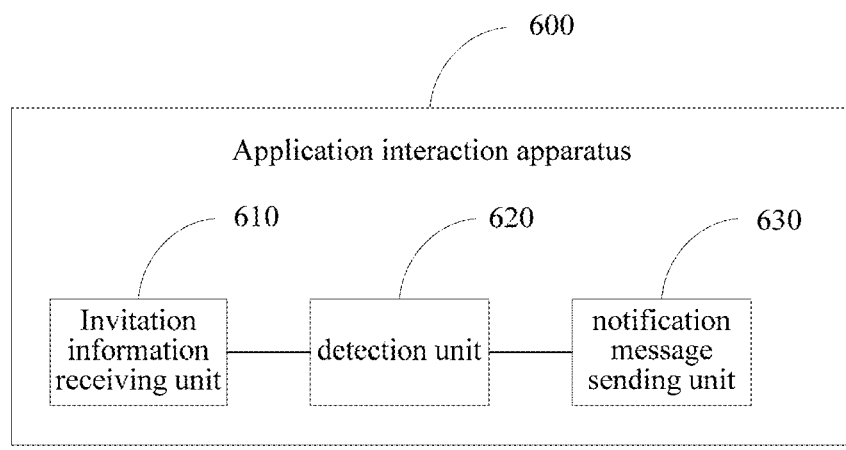
FIG. 6 is a schematic structural diagram of an application interaction apparatus according to a first embodiment of the present invention.

Referring to FIG. 6, FIG. 6 is a schematic structural diagram of an application interaction apparatus according to a first embodiment of the present invention. The application interaction apparatus 600 may be used to implement the application interaction method shown with reference to FIG. 1. The application interaction apparatus 600 may include at least an invitation information receiving unit 610, a detection unit 620, and a notification message sending unit 630.

The invitation information receiving unit 610 is configured to receive application invitation information sent by a target application running in a first terminal, where the application invitation information may carry application interaction information of the target application. Optionally, the application interaction information may include an application type and/or application identification information of the target application. The application type may include a one-screen application or a non-one-screen application.

Optionally, when an interactive application is started, the invitation information receiving unit 610 may receive the application invitation information sent by the target application running in the first terminal. For example, if the first terminal needs to perform application interaction with the application interaction apparatus 600, a user corresponding to the application interaction apparatus 600 submits, to the application interaction apparatus 600, a start instruction for starting the interactive application. After the application interaction apparatus 600 starts the interactive application according to the start instruction, the invitation information receiving unit 610 may receive the application invitation information sent by the target application running in the first terminal. For another example, when the interactive application is started, the invitation information receiving unit 610 may scan to find whether the application invitation information that is broadcast by the target application by using a preset broadcast interface is received. Optionally, the application interaction apparatus 600 may establish a communication connection to the first terminal. When the interactive application is started, the invitation information receiving unit 610 may receive the application invitation information that is sent by the target application by using the communication connection.

Optionally, after an interactive application is started, the invitation information receiving unit 610 may receive the application invitation information sent by the target application running in the first terminal. For example, the application interaction apparatus 600 may establish a communication connection to the first terminal. After the interactive application is started, the invitation information receiving unit 610 may receive the application invitation information that is sent by the target application by using the communication connection. For another example, in a running process of the interactive application, the invitation information receiving unit 610 may scan to find whether the application invitation information sent by the target application is received.

The detection unit 620 is configured to detect, according to the application interaction information, whether the interactive application and the target application are a same application. For example, if the application interaction information includes an application type of the target application, and the detection unit 620 determines, according to the application interaction information, that the application type of the target application is a one-screen application, and an application type of the application interaction apparatus 600 is a non-one-screen application, the detection unit 620 may detect that the interactive application and the target application are different applications.

The notification message sending unit 630 is configured to: if the detection unit 620 detects that the interactive application and the target application are different applications, send a notification message to an interaction application, corresponding to the application interaction information, in a preset storage area according to the application invitation information, so that the interaction application establishes a session connection to the target application according to the notification message. The notification message is used to trigger the interaction application to establish a session connection to the target application. The notification message may include an IP address and/or a port number of the first terminal, or the like.

In the application interaction apparatus shown in FIG. 6, the invitation information receiving unit 610 receives application invitation information sent by a target application running in a first terminal, where the application invitation information carries application interaction information of the target application. When the detection unit 620 detects, according to the application interaction information, that an interactive application and the target application are different applications, the notification message sending unit 630 sends a notification message to an interaction application, corresponding to the application interaction information, in a preset storage area according to the application invitation information, so that the interaction application establishes a session connection to the target application according to the notification message, which is easy to operate, and can improve application interaction processing efficiency.

Figure 7:
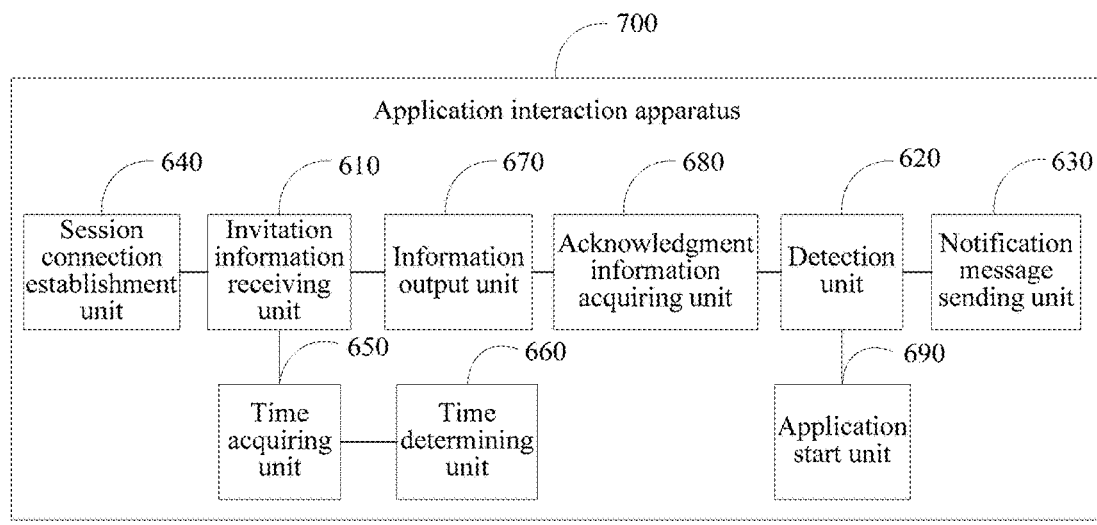
FIG. 7 is a schematic structural diagram of an application interaction apparatus according to a second embodiment of the present invention.

Referring to FIG. 7, FIG. 7 is a schematic structural diagram of an application interaction apparatus according to a second embodiment of the present invention. The application interaction apparatus 700 may be used to implement some or all steps of the application interaction method in the method embodiments shown with reference to FIG. 2 to FIG. 5. The application interaction apparatus 700 may include at least an invitation information receiving unit 610, a detection unit 620, and a notification message sending unit 630.

The invitation information receiving unit 610 is configured to receive application invitation information sent by a target application running in a first terminal, where the application invitation information carries application interaction information of the target application.

The detection unit 620 is configured to detect, according to the application interaction information, whether a currently triggered interactive application and the target application are a same application.

The notification message sending unit 630 is configured to: if the detection unit 620 detects that the interactive application and the target application are different applications, send a notification message to an interaction application, corresponding to the application interaction information, in a preset storage area according to the application invitation information, so that the interaction application establishes a session connection to the target application according to the notification message.

Figure 8:
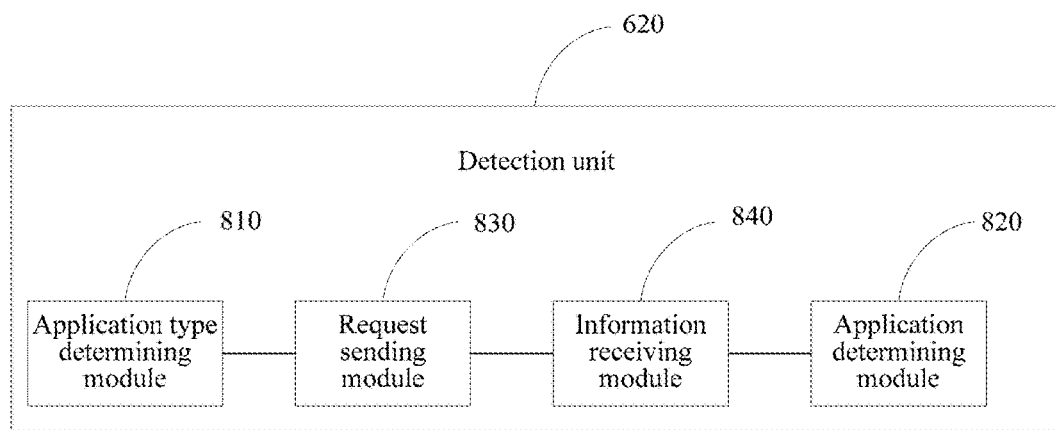
FIG. 8 is a schematic structural diagram of a detection unit in FIG. 7 according to an embodiment of the present invention.

In an optional implementation manner, the application interaction information may include an application type of the target application, and the detection unit 620 in this embodiment of the present invention may, as shown in FIG. 8, further include:

an application type determining module 810, configured to determine, according to the application interaction information, that the application type of the target application is a one-screen application; and an application determining module 820, configured to: if an application type of the interactive application is a non-one-screen application, determine that the interactive application and the target application are different applications.

The application determining module 820 is further configured to: if the application type of the interactive application is a one-screen application, determine that the interactive application and the target application are a same application.

In an optional implementation manner, the application interaction information may include an application type of the target application and application identification information of the target application, and the detection unit 620 in this embodiment of the present invention may, as shown in FIG. 8, further include:

an application type determining module 810, configured to determine, according to the application interaction information, that the application type of the target application is a non-one-screen application; and an application determining module 820, configured to: if an application type of the interactive application is a nonone-screen application, and application identification information of the interactive application is different from the application identification information of the target application, determine that the interactive application and the target application are different applications.

The application determining module 820 is further configured to: if the application type of the interactive application is a one-screen application, determine that the interactive application and the target application are different applications.

The application determining module 820 is further configured to: if the application type of the interactive application is a non-one-screen application, and the application identification information of the interactive application is the same as the application identification information of the target application, determine that the interactive application and the target application are a same application.

In an optional implementation manner, the application interaction information may include an application type of the target application, and the detection unit 620 in this embodiment of the present invention may, as shown in FIG. 8, further include:

an application type determining module 810, configured to determine, according to the application interaction information, that the application type of the target application is a non-one-screen application;

a request sending module 830, configured to: if an application type of the interactive application is a non-one-screen application, send a request message to the first terminal, where the request message is used to request to obtain application identification information of the target application;

an information receiving module 840, configured to receive the application identification information of the target application that is sent by the first terminal; and an application determining module 820, configured to: if application identification information of the interactive application is different from the application identification information of the target application, determine that the interactive application and the target application are different applications.

In an optional implementation manner, the application interaction information may include application identification information of the target application, and the detection unit 620 in this embodiment of the present invention may, as shown in FIG. 8, further include: an application type determining module 810, configured to determine an application type of the target application according to the application identification information of the target application, where for example, if the application identification information of the target application is a "video", the application type determining module 810 may determine that the application type of the target application is a one-screen application, and the application type determining module 810 may obtain a correspondence between the application identification information and the application type, and obtain a corresponding application type according to the application identification information of the target application, where for example, an application type of an application whose application identification information is a "video", "music", a "slideshow", or "Gomoku" is a one-screen application, and an application type of an application whose application identification information is "Fighting the Landlord", "Mahjong", or "Legends of the Three Kingdoms" is a non-one-screen application; and an application determining module 820, configured to detect, according to the application type of the target application, whether the interactive application and the target application are a same application.

For example, if the application identification information of the target application is "Fighting the Landlord", the application type determining module 810 may determine that the application type of the target application is a non-one-screen application. If an application type of the application interaction apparatus 700 is a non-one-screen application, and application identification information of the application interaction apparatus 700 is different from the application identification information of the target application, the application determining module 820 may detect that the application interaction apparatus 700 and the target application are different applications.

In this embodiment of the present invention, the application may include a one-screen application or a non-one-screen application. For example, the one-screen application may include an application such as a video, music, or a slideshow. A one-screen application program such as a video, music, or a slideshow may run in a one-screen client. Using the one-screen client as a universal client for the one-screen application program such as a video, music, or a slideshow can prevent research and development personnel from developing a corresponding client for each one-screen application, thereby reducing research and development costs.

In an optional implementation manner, the application interaction apparatus 700 in this embodiment of the present invention may further include:

a session connection establishment unit 640, configured to: if the detection unit 620 detects that the interactive application and the target application are a same application, establish a session connection between the interactive application and the target application.

In an optional implementation manner, the detection unit 620 is further configured to: before the notification message sending unit 630 sends the notification message to the interaction application, corresponding to the application interaction information, in the preset storage area according to the application invitation information, detect whether the interaction application is started.

The application interaction apparatus 700 may further include:

an application start unit 690, configured to: if the detection unit 620 detects that the interaction application is not started, start the interaction application.

Further optionally, the detection unit 620 is further configured to: when detecting that the interaction application is not started, detect whether an installation package of the interaction application exists in a preset application database, and if the installation package of the interaction application does not exist in the application database, send a download request message for downloading the interaction application to the first terminal, so that the first terminal feeds back the installation package of the interaction application according to the download request message.

The application start unit 690 is further configured to install and start the interaction application according to the installation package of the interaction application.

Figure 9:
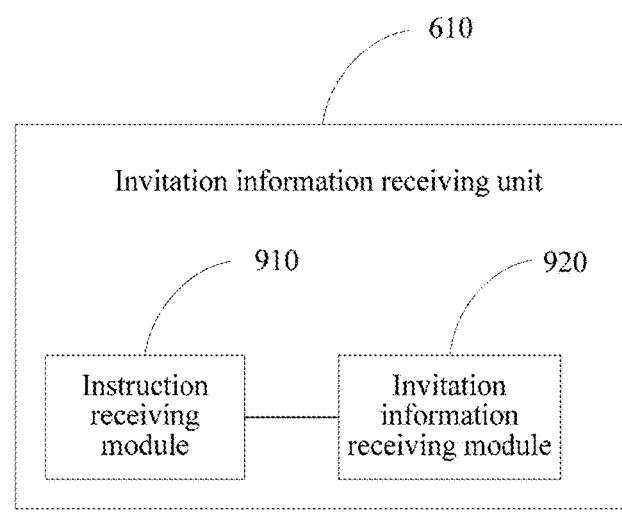
FIG. 9 is a schematic structural diagram of an invitation information receiving unit in FIG. 7 according to an embodiment of the present invention.

In an optional implementation manner, the invitation information receiving unit 610 in this embodiment of the present invention may, as shown in FIG. 9, further include:

an instruction receiving module 910, configured to receive an information scanning instruction entered by a user; and an invitation information receiving module 920, configured to receive, according to the information scanning instruction, the application invitation information that is sent by the target application by using a preset broadcast interface. The preset broadcast interface may include a Bluetooth broadcast interface, a Wi-Fi broadcast interface, or the like. The information scanning instruction may be entered by the user by pressing a physical button or a soft button of the application interaction apparatus 700. Optionally, the information scanning instruction may be entered when a sensor detects that a preset operation such as a "swing" occurs in the application interaction apparatus 700. In this embodiment of the present invention, the invitation information receiving module 920 receives, according to the information scanning instruction, the application invitation information sent by the target application, so that the instruction receiving module 910 can be prevented from continuously scanning the application invitation information that is broadcast by the target application, thereby saving battery power of the application interaction apparatus 700.

In an optional implementation manner, the application interaction client 600 in this embodiment of the present invention may further include:

a time acquiring unit 650, configured to: before the detection unit 620 detects, according to the application interaction information, whether the interactive application and the target application are a same application, obtain a receiving time at which the interactive application receives the application invitation information, where the time acquiring unit 650 is further configured to query for a receiving time at which at least one associated application receives the application invitation information, where the associated application may include a one-screen application or a non-one-screen application; and a time determining unit 660, configured to determine that the receiving time at which the interactive application receives the application invitation information is earlier than receiving times at which all associated applications receive the application invitation information.

For example, after the invitation information receiving unit 610 receives the application invitation information sent by the target application, the time acquiring unit 650 may send query request information to an operating system. The query request information may carry an application ID of the interactive application, so that the operating system determines, according to the application ID of the interactive application, whether the associated application receives the application invitation information. If the associated application receives the application invitation information, the associated application feeds back a receiving time at which the associated application receives the application invitation information. If the time determining unit 660 determines that the receiving time at which the interactive application receives the application invitation information is earlier than receiving times at which all associated applications receive the application invitation information, the detection unit 620 detects, according to the application interaction information, whether an application running in an application interaction client and the target application are a same application.

In an optional implementation manner, the application interaction apparatus 700 in this embodiment of the present invention may further include:

an information output unit 670, configured to: before the detection unit 620 detects, according to the application interaction information, whether the interactive application and the target application are a same application, output application interaction prompt information, where the application interaction prompt information is used to prompt the user whether to perform application interaction, where in this embodiment of the present invention, application interaction in a case of unwillingness of a user is avoided, so that application interaction accuracy can be improved; and an acknowledgment information acquiring unit 680, configured to obtain application interaction acknowledgment information that is submitted by the user for the application interaction prompt information.

In an optional implementation manner, the application interaction apparatus 700 in this embodiment of the present invention may be applied to a one-screen client, that is, only a one-screen client exists on a display interface or a desktop of the second terminal, and no non-one-screen client exists. The non-one-screen client is, for example, a Fighting the Landlord client or a Legends of the Three Kingdoms client. When the first terminal needs to perform application interaction with the second terminal, the second terminal may start the one-screen client. A one-screen application running in the second terminal may receive application invitation information sent by a target application running in the first terminal, and the application invitation information carries application interaction information of the target application, detect, according to the application interaction information, whether the interactive application and the target application are a same application, that is, detect whether the target application is a one-screen application, and if the target application is a one-screen application, determine that the interactive application and the target application are a same application, and further establish a session connection to the target application; or if the target application is a non-one-screen application, the one-screen application may determine that the interactive application and the target application are different applications, and further send a notification message to an interaction application, corresponding to the application interaction information, in a preset storage area according to the application invitation information, so that the interaction application establishes a session connection to the target application according to the notification message.

For example, if the target application running in the first terminal is a Fighting the Landlord application, when the detection unit 620 detects that the interactive application and the target application are different applications, the notification message sending unit 630 sends a notification message to an interaction application, whose application identification information is the same as application identification information of the target application, in a preset storage area, so that a session connection is established between the interaction application and the target application. A display interface of the second terminal may show a Fighting the Landlord interface.

In this embodiment of the present invention, a one-screen client is used as a universal client, that is, only a one-screen client exists on a display interface or a desktop of the second terminal, and no non-one-screen client exists. Compared with a case in which both a one-screen client and a non-one-screen client are shown on a display interface or a desktop of the second terminal, resulting in that a user needs to determine an application type of a target application, and start a corresponding client according to a determining result, in this embodiment of the present invention, a user needs to start only a universal client, which is easy to operate, and can improve operation convenience.

Figure 10:
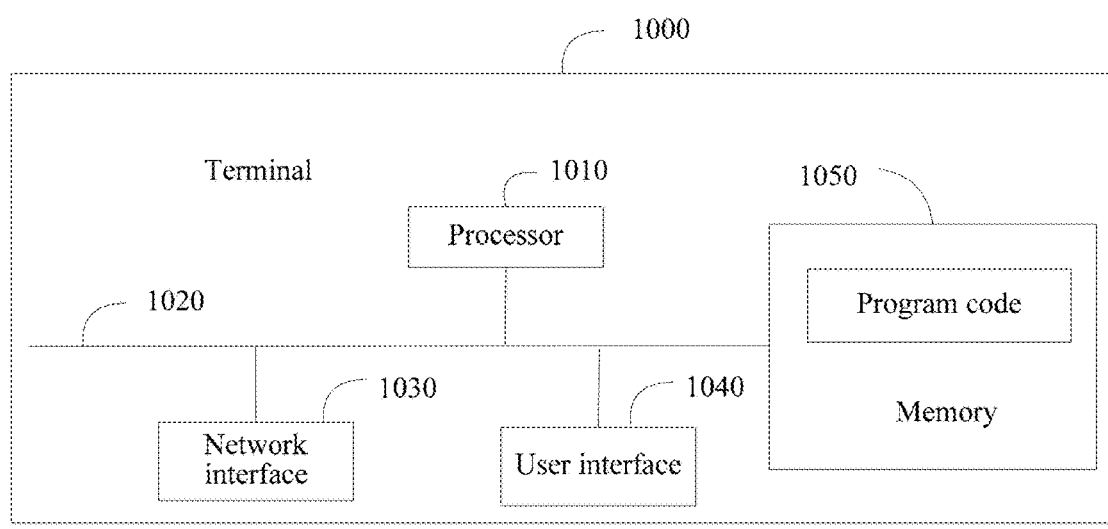
FIG. 10 is a schematic structural diagram of a terminal according to an embodiment of the present invention.

Referring to FIG. 10, FIG. 10 is a schematic structural diagram of a terminal according to an embodiment of the present invention. The terminal is configured to perform the application interaction method provided in the embodiments of the present invention. As shown in FIG. 10, the terminal

1000 includes: at least one processor 1010, for example, a CPU, at least one network interface 1030, a user interface 1040, a memory 1050, and at least one communications bus 1020. The communications bus 1020 is configured to implement connection communication among these components. Optionally, the network interface 1030 may include a standard wired interface, a wireless interface (for example, a Wi-Fi interface). The user interface 1040 may include a display (Display), and a keyboard (Keyboard). Optionally, the user interface 1040 may further include a standard wired interface, and a wireless interface. The memory 1050 may include a high-speed RAM memory, or may further include a non-volatile memory (non-volatile memory), for example, at least one magnetic disk storage. Optionally, the memory 1050 may include at least one storage apparatus that is located far away from the foregoing processor 1010. The processor 1010 may be combined with the application interaction apparatus shown in FIG. 6 to FIG. 9. The memory 1050 stores a set of instructions (for example, program code), and the processor 1010 invokes the instructions stored in the memory 1050, to perform the following operations:

receiving, by using the network interface 1030, application invitation information sent by a target application running in a first terminal, where the application invitation information may carry application interaction information of the target application. Optionally, the application interaction information may include an application type and/or application identification information of the target application.

Optionally, when an interactive application is started, the processor 1010 may receive, by using the network interface 1030, the application invitation information sent by the target application running in the first terminal. For example, if the first terminal needs to perform application interaction with the terminal 1000, a user corresponding to the terminal 1000 submits, to the terminal 1000, a start instruction for starting the interactive application. After the terminal 1000 starts the interactive application according to the start instruction, the processor 1010 may receive, by using the network interface 1030, the application invitation information sent by the target application running in the first terminal. For another example, when the interactive application is started, the processor 1010 may scan to find whether the application invitation information that is broadcast by the target application by using a preset broadcast interface is received. Optionally, the terminal 1000 may establish a communication connection to the first terminal. When the interactive application is started, the processor 1010 may receive, by using the network interface 1030, the application invitation information that is sent by the target application by using the communication connection.

Optionally, after the interactive application is started, the processor 1010 may receive, by using the network interface 1030, the application invitation information sent by the target application running in the first terminal. For example, the terminal 1000 may establish a communication connection to the first terminal. After the interactive application is started, the processor 1010 may receive, by using the network interface 1030, the application invitation information that is sent by the target application by using the communication connection. For another example, in a running process of the interactive application, the processor 1010 may scan to find whether the application invitation information sent by the target application is received.

It is detected, according to the application interaction information, whether the interactive application and the target application are a same application. For example, if the application interaction information includes the application type of the target application, and the processor 1010 determines, according to the application interaction information, that the application type of the target application is a one-screen application, and an application type of an application running in the terminal 1000 is a non-one-screen application, the processor 1010 may detect that the interactive application and the target application are different applications.

If it is detected that the interactive application and the target application are different applications, a notification message is sent to an interaction application, corresponding to the application interaction information, in a preset storage area according to the application invitation information, so that the interaction application establishes a session connection to the target application according to the notification message. The notification message is used to trigger the interaction application to establish a session connection to the target application. The notification message may include an IP address and/or a port number of the first terminal, or the like.

In an optional implementation manner, the application interaction information may include the application type of the target application, and the detecting, by the processor 1010 according to the application interaction information, whether the interactive application and the target application are a same application may specifically include:

determining, according to the application interaction information, that the application type of the target application is a one-screen application;

if an application type of the interactive application is a non-one-screen application, determining that the interactive application and the target application are different applications; or if an application type of the interactive application is a one-screen application, determining that the interactive application and the target application are a same application.

In an optional implementation manner, the application interaction information may include the application type of the target application and the application identification information of the target application, and the detecting, by the processor 1010 according to the application interaction information, whether the interactive application and the target application are a same application may specifically include:

determining, according to the application interaction information, that the application type of the target application is a non-one-screen application;

if an application type of the interactive application is a non-one-screen application, and application identification information of the interactive application is different from the application identification information of the target application, determining that the interactive application and the target application are different applications;

if an application type of the interactive application is a one-screen application, determining that the interactive application and the target application are different applications; or if an application type of the interactive application is a non-one-screen application, and application identification information of the interactive application is the same as the application identification information of the target application, determining that the interactive application and the target application are a same application.

In an optional implementation manner, the application interaction information may include the application type of the target application, and the detecting, by the processor

1010 according to the application interaction information, whether the interactive application and the target application are a same application may specifically include:

determining, according to the application interaction information, that the application type of the target application is a non-one-screen application;

if an application type of the interactive application is a non-one-screen application, sending a request message to the first terminal by using the network interface 1030, where the request message is used to request to obtain the application identification information of the target application;

receiving, by using the network interface 1030, the application identification information of the target application that is sent by the first terminal; and if application identification information of the interactive application is different from the application identification information of the target application, determining that the interactive application and the target application are different applications.

In an optional implementation manner, the application interaction information may include the application identification information of the target application, and the detecting, by the processor 1010 according to the application interaction information, whether the interactive application and the target application are a same application may specifically include:

determining the application type of the target application according to the application identification information of the target application, where for example, if the application identification information of the target application is a "video", the processor 1010 may determine that the application type of the target application is a one-screen application, and the processor 1010 may obtain a correspondence between the application identification information and the application type, and obtain a corresponding application type according to the application identification information of the target application, where for example, an application type of an application whose application identification information is a "video", "music", a "slideshow", or "Gomoku" is a one-screen application, and an application type of an application whose application identification information is "Fighting the Landlord", "Mahjong", or "Legends of the Three Kingdoms" is a non-one-screen application; and detecting, according to the application type of the target application, whether the interactive application and the target application are a same application.

For example, if the application identification information of the target application is "Fighting the Landlord", the processor 1010 may determine that the application type of the target application is a non-one-screen application. If an application type of the interactive application is a non-one-screen application, and application identification information of the interactive application is different from the application identification information of the target application, the processor 1010 may detect that the interactive application and the target application are different applications.

In this embodiment of the present invention, the application may include a one-screen application or a non-one-screen application. For example, the one-screen application may include an application such as a video, music, or a slideshow. A one-screen application program such as a video, music, or a slideshow may run in a one-screen client. Using the one-screen client as a universal client for the one-screen application program such as a video, music, or a slideshow can prevent research and development personnel from developing a corresponding client for each one-screen application, thereby reducing research and development costs.

In an optional implementation manner, after detecting, according to the application interaction information, whether the interactive application and the target application are a same application, the processor 1010 may further perform the following operation:

if it is detected that the interactive application and the target application are a same application, establishing a session connection between the interactive application and the target application.

In an optional implementation manner, before sending the notification message to the interaction application, corresponding to the application interaction information, in the preset storage area according to the application invitation information, the processor 1010 may further perform the following operations:

detecting whether the interaction application is started;

if the interaction application is not started, starting the interaction application;

further optionally, when the processor 1010 detects that the interaction application is not started, detecting whether an installation package of the interaction application exists in a preset application database. If the installation package of the interaction application does not exist in the application database, sending, by using the network interface 1030, a download request message for downloading the interaction application to the first terminal, so that the first terminal feeds back the installation package of the interaction application according to the download request message; and installing and starting the interaction application according to the installation package of the interaction application.

In an optional implementation manner, the receiving, by the processor 1010 by using the network interface 1030, the application invitation information sent by the target application running in the first terminal may specifically include:

receiving, by using the user interface 1040, an information scanning instruction entered by a user; and receiving, according to the information scanning instruction, the application invitation information that is sent by the target application by using a preset broadcast interface, where the preset broadcast interface may include a Bluetooth broadcast interface, a Wi-Fi broadcast interface, or the like, where the information scanning instruction may be entered by the user by pressing a physical button or a soft button of the terminal 1000; optionally, the information scanning instruction may be entered when a sensor detects that a preset operation such as a "swing" occurs in the terminal 1000.

In an optional implementation manner, before detecting, according to the application interaction information, whether the interactive application and the target application are a same application, the processor 1010 may further perform the following operations:

acquiring a receiving time at which the interactive application receives the application invitation information;

querying for a receiving time at which at least one associated application receives the application invitation information, where the associated application may include a one-screen application or a non-one-screen application; and determining that the receiving time at which the interactive application receives the application invitation information is earlier than receiving times at which all associated applications receive the application invitation information.

For example, after receiving the application invitation information sent by the target application, the processor

1010 may send query request information to an operating system. The query request information may carry an application ID of the interactive application, so that the operating system determines, according to the application ID of the interactive application, whether the associated application receives the application invitation information. If the associated application receives the application invitation information, the associated application feeds back a receiving time at which the associated application receives the application invitation information. If the processor 1010 determines that the receiving time at which the interactive application receives the application invitation information is earlier than receiving times at which all associated applications receive the application invitation information, the processor 1010 detects, according to the application interaction information, whether the interactive application and the target application are a same application.

In an optional implementation manner, before detecting, according to the application interaction information, whether the interactive application and the target application are a same application, the processor 1010 may further perform the following operations:

outputting application interaction prompt information, where the application interaction prompt information is used to prompt the user whether to perform application interaction; and acquiring application interaction acknowledgment information that is submitted by the user for the application interaction prompt information.

Specifically, the terminal 1000 described in this embodiment of the present invention may be configured to implement some or all procedures in the application interaction method embodiments described with reference to FIG. 1 to FIG. 5 in the present invention.

In the descriptions of this specification, a description of a reference term such as "an embodiment", "some embodiments", "an example", "a specific example", or "some examples" means that a specific feature, structure, material, or characteristic that is described with reference to the embodiment or the example is included in at least one embodiment or example of the present invention. In this specification, exemplary descriptions of the foregoing terms do not necessarily refer to a same embodiment or example. In addition, the described specific feature, structure, material, or characteristic may be combined in a proper manner in any one or more embodiments or examples. In addition, with no conflict, a person skilled in the art can integrate and combine different embodiments or examples and features of the different embodiments and examples described in this specification.

In addition, terms "first" and "second" are used only for description objectives, and shall not be construed as indicating or implying relative importance or implying a quantity of indicated technical features. Therefore, a feature restricted by "first" or "second" may explicitly indicate or implicitly include at least one such feature. In the descriptions of the present invention, "multiple" refers to at least two, for example, two, or three, unless otherwise specifically limited in detail.

A description of any process or method in the flowcharts or described herein in another manner can be construed as one or more modules, fragments, or parts that include executable instructions used to implement a specific logical function or steps of a process. In addition, the scope of the preferred implementation manners of the present invention includes another implementation, where functions can be performed not in an order shown or discussed, including performing the functions basically at the same time or in reverse order according to the functions involved. This should be understood by a person skilled in the technical field to which the embodiments of the present invention belong.

The logic and/or steps shown in the flowcharts or described herein in another manner, for example, can be considered as a program list of the executable instructions used to implement the logical functions, and can be specifically implemented in any computer readable medium, to be used by an instruction execution system, apparatus, or device (for example, a computer-based system, a system including a processor, or another system that can obtain an instruction from the instruction execution system, apparatus, or device and execute the instruction), or to be used in combination with the instruction execution system, apparatus, or device. In the context of this specification, a "computer readable medium" may be any apparatus that can include, store, communicate, propagate, or transmit the program for use by the instruction execution system, apparatus, or device or in combination with the instruction execution system, apparatus, or device. More specific examples (a nonexhaustive list) of the computer readable medium include the following: an electrical connection (electronic apparatus) having one or more wires, a portable computer diskette (magnetic apparatus), a random access memory (RAM), a read-only memory (ROM), an erasable programmable read-only memory (EPROM or flash memory), an optical fiber apparatus, and a portable compact disc read-only memory (CDROM). Moreover, the computer readable medium even may be paper or another proper medium on which the program may be printed, because the program can be electronically captured, by means of for example, optical scanning of the paper or another medium, then compiled, interpreted, or otherwise processed in a proper manner if necessary, and then stored in a computer memory.

It should be understood that the parts of the present invention may be implemented by hardware, software, firmware, or a combination thereof. In the foregoing implementation manners, multiple steps or methods may be implemented by using software or firmware that is stored in the memory and that is executed by a proper instruction execution system. For example, if hardware is used for the implementation, similar to in another implementation manner, any one or a combination of the following technologies known in the field may be used for the implementation: a discrete logic circuit having a logic gate circuit configured to implement a logical function for a data signal, an application-specific integrated circuit having a proper combined logic gate circuit, a programmable gate array (PGA), a field programmable gate array (FPGA), or the like.

A person of ordinary skill in the art may understand that all or some steps carried in the method in the foregoing embodiment may be implemented by a program instructing relevant hardware. The program may be stored in a computer readable storage medium. When the program is run, one or a combination of the steps of the method embodiment is performed.

In addition, functional units in the embodiments of the present invention may be integrated into one processing module, or each of the units may exist alone physically, or two or more units are integrated into one module. The integrated module may be implemented in a form of hardware, or may be implemented in a form of a software functional module. When the integrated module is implemented in the form of a software functional module and sold or used as an independent product, the integrated module may be stored in a computer-readable storage medium.

The storage medium mentioned above may be a read-only memory, a magnetic disk, a compact disc, or the like. Although the embodiments of the present invention are shown and described above, it can be understood that the foregoing embodiments are exemplary, and should not be construed as limitations to the present invention. A person of ordinary skill in the art can make changes, modifications, replacements, and variations to the foregoing embodiments within the scope of the present invention.

The invention claimed is:

1. An application interaction method, comprising:
   receiving, at a second terminal, from a target application running on a first terminal, application invitation information, wherein the application invitation information comprises application interaction information of the target application;
   identifying, by the second terminal, an interactive application on the second terminal;
   detecting, according to the application interaction information, whether the interactive application and the target application are a same application; and
   if the interactive application and the target application are different applications:
      sending a notification message to the interactive application establishing, via the interactive application, a session connection to the target application according to the notification message;
   the application interaction information comprises an application type of the target application; and
   detecting, according to the application interaction information, whether the interactive application and the target application are a same application comprises:
      determining, according to the application interaction information, that the application type of the target application is a one-screen application, and
      if an application type of the interactive application is a non-one-screen application, determining that the interactive application and the target application are different applications.

2. The method according to claim 1, wherein:
   the application interaction information comprises an application type of the target application and application identification information of the target application; and
   detecting, according to the application interaction information, whether the interactive application and the target application are a same application comprises:
   determining, according to the application interaction information, that the application type of the target application is a non-one-screen application, and
   if an application type of the interactive application is a non-one-screen application, and application identification information of the interactive application is different from the application identification information of the target application, determining that the interactive application and the target application are different applications.

3. The method according to claim 1, wherein:
   the application interaction information comprises an application type of the target application; and
   detecting, according to the application interaction information, whether the interactive application and the target application are a same application comprises:
      determining, according to the application interaction information, that the application type of the target application is a non-one-screen application,
      if an application type of the interactive application is a non-one-screen application, sending a request message to the first terminal, wherein the request message requests application identification information of the target application,
      receiving the application identification information of the target application that is sent by the first terminal, and
      if application identification information of the interactive application is different from the application identification information of the target application, determining that the interactive application and the target application are different applications.

4. The method according to claim 1, wherein:
   the application interaction information comprises application identification information of the target application; and
   detecting, according to the application interaction information, whether the interactive application and the target application are a same application comprises:
      determining an application type of the target application according to the application identification information of the target application, and
      detecting, according to the application type of the target application, whether the interactive application and the target application are a same application.

5. The method according to claim 1, wherein after detecting, according to the application interaction information, whether the interactive application and the target application are a same application, the method further comprises:
   if the interactive application and the target application are a same application, establishing a session connection between the interactive application and the target application.

6. The method according to claim 1, wherein before sending a notification message to an interaction application, the method further comprises:
   detecting whether the interaction application has started; and
   if the interaction application is not started, starting the interaction application.

7. The method according to claim 6, wherein after detecting whether the interaction application is started, the method further comprises:
   if the interaction application is not started, detecting whether an installation package of the interaction application exists in a preset application database;
   if the installation package of the interaction application does not exist in the application database, sending a download request message for downloading the interaction application to the first terminal; and
   installing and starting the interaction application according to the installation package of the interaction application.

8. The method according to claim 1, wherein receiving application invitation information sent by a target application running on a first terminal comprises:
   receiving an information scanning instruction; and
   receiving, according to the information scanning instruction, the application invitation information that is sent by the target application, via, a preset broadcast interface.

9. The method according to claim 1, wherein before detecting, according to the application interaction information, whether the interactive application and the target application are a same application, the method further comprises:
acquiring a first receiving time that indicates a time that the interactive application receives the application invitation information;
querying for a second receiving time that indicates a time that at which at least one associated application receives the application invitation information; and
determining that the first receiving time is earlier than the second receiving time.

10. The method according to claim 1, wherein before detecting, according to the application interaction information, whether the interactive application and the target application are a same application, the method further comprises:
outputting application interaction prompt information, wherein the application interaction prompt information prompts a user to perform an application interaction; and
acquiring, based on the application interaction prompt information, application interaction acknowledgment information.

11. A second terminal, comprising:
a network device;
a memory storing a set of instructions; and
a processor configured to invoke the set of instructions stored in the memory and when executed by the processor, cause the terminal to:
receive, from a target application running on a first terminal, application invitation information, wherein the application invitation information comprises application interaction information of the target application;
identify an interactive application on the second terminal;
detect, according to the application interaction information, whether the interactive application and the target application are a same application; and
if the interactive application and the target application are different applications:
send a notification message to the interactive application establish, via the interactive application, a session connection to the target application according to the notification message;
the application interaction information comprises an application type of the target application; and
the processor is further configured to invoke the set of instructions stored in the memory and when executed by the processor, cause the terminal to:
determine, according to the application interaction information, that the application type of the target application is a one-screen application; and
if an application type of the interactive application is a non-one-screen application, determine that the interactive application and the target application are different applications.

12. The terminal according to claim 11, wherein:
the application interaction information comprises an application type of the target application and application identification information of the target application; and
the processor is further configured to invoke the set of instructions stored in the memory and when executed by the processor, cause the terminal to:
determine, according to the application interaction information, that the application type of the target application is a non-one-screen application, and
if an application type of the interactive application is a non-one-screen application, and application identification information of the interactive application is different from the application identification information of the target application, determine that the interactive application and the target application are different applications.

13. The terminal according to claim 11, wherein:
the application interaction information comprises an application type of the target application; and
the processor is further configured to invoke the set of instructions stored in the memory and when executed by the processor, cause the terminal to:
determine, according to the application interaction information, that the application type of the target application is a non-one-screen application,
if an application type of the interactive application is a non-one-screen application, send a request message to the first terminal, wherein the request message requests application identification information of the target application,
receive the application identification information of the target application that is sent by the first terminal, and
if application identification information of the interactive application is different from the application identification information of the target application, determine that the interactive application and the target application are different applications.

14. The terminal according to claim 11, wherein:
the application interaction information comprises application identification information of the target application; and
the processor is further configured to invoke the set of instructions stored in the memory and when executed by the processor, cause the terminal to:
determine an application type of the target application according to the application identification information of the target application, and
detect, according to the application type of the target application, whether the interactive application and the target application are a same application.

15. The terminal according to claim 11, wherein the processor is further configured to invoke the set of instructions stored in the memory and when executed by the processor, cause the terminal to:
after detecting, according to the application interaction information, that the interactive application and the target application are a same application, establish a session connection between the interactive application and the target application.

16. The terminal according to claim 11, wherein the processor is further configured to invoke the set of instructions stored in the memory and when executed by the processor, cause the terminal to:
before sending a notification message to an interaction application, detect whether the interaction application is started, and if the interaction application is not started, start the interaction application.

17. The terminal according to claim 16, wherein the processor is further configured to invoke the set of instructions stored in the memory and when executed by the processor, cause the terminal to:
if the interaction application has not started, detect whether an installation package of the interaction application exists in a preset application database;
if the installation package of the interaction application does not exist in the application database; and install and start the interaction application according to the installation package of the interaction application.

18. The terminal according to claim 11, wherein the processor is further configured to invoke the set of instructions stored in the memory and when executed by the processor, cause the terminal to:
receive an information scanning instruction; and
receive, according to the information scanning instruction, the application invitation information.

* * * * *